(12) United States Patent
Kretschmann

(10) Patent No.: US 12,538,395 B2
(45) Date of Patent: Jan. 27, 2026

(54) ILLUMINATION DEVICE AND ILLUMINATION PROCESS WITH LIMITATION OF MAXIMUM IRRADIANCE

(71) Applicant: Drägerwerk AG & Co. KGaA, Lübeck (DE)

(72) Inventor: Hanno Kretschmann, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 166 days.

(21) Appl. No.: 18/457,464

(22) Filed: Aug. 29, 2023

(65) Prior Publication Data
US 2024/0080952 A1 Mar. 7, 2024

(30) Foreign Application Priority Data
Sep. 5, 2022 (DE) .............. 10 2022 122 413.9

(51) Int. Cl.
| | | |
|---|---|---|
| H05B 45/12 | (2020.01) | |
| H05B 47/105 | (2020.01) | |
| H05B 47/155 | (2020.01) | |
| H05B 47/175 | (2020.01) | |

(52) U.S. Cl.
CPC .......... H05B 45/12 (2020.01); H05B 47/105 (2020.01); H05B 47/155 (2020.01); H05B 47/175 (2020.01)

(58) Field of Classification Search
CPC .... H05B 45/12; H05B 47/105; H05B 47/155; H05B 47/175; A61B 90/30; A61B 2090/309
See application file for complete search history.

(56) References Cited

U.S. PATENT DOCUMENTS

| | | |
|---|---|---|
| 9,491,835 B2 | 11/2016 | Elfring et al. |
| 9,504,113 B2 | 11/2016 | Sattler et al. |
| 2017/0030573 A1 | 2/2017 | Alexanderson et al. |

(Continued)

FOREIGN PATENT DOCUMENTS

| | | |
|---|---|---|
| DE | 102012014716 A1 | 5/2014 |
| DE | 102013012231 A1 | 1/2015 |

(Continued)

*Primary Examiner* — Alexander H Taningco
*Assistant Examiner* — Pedro C Fernandez
(74) *Attorney, Agent, or Firm* — McGlew and Tuttle, P.C.

(57) ABSTRACT

An illumination device and process illuminate a surface of an object. The device includes plural illumination units and a signal processing control unit. Each illumination unit illuminates the surface with a maximum irradiance, wherein the device illuminates the surface with a maximum total irradiance that depends on the maximum irradiances of the illumination units. The device captures a maximum total irradiance user specification of the device or units. The control unit controls the maximum irradiance of each illumination unit independently and responds to the user specification by predicting the maximum total irradiance of the device operated according to the user specification, compares the predicted maximum total irradiance with a specified upper threshold and if greater than the upper threshold, controls one or more illumination units depending on the user specification such that the actually achieved maximum total irradiance is less than or equal to the upper threshold.

20 Claims, 6 Drawing Sheets

(56) References Cited

U.S. PATENT DOCUMENTS

| | | | | |
|---|---|---|---|---|
| 2017/0318644 A1* | 11/2017 | Hartl | ............... | H05B 47/115 |
| 2018/0124892 A1* | 5/2018 | Hollopeter | ............ | H05B 47/17 |
| 2022/0110201 A1* | 4/2022 | Alexanderson | ...... | H05B 47/115 |
| 2022/0256671 A1* | 8/2022 | Matz | .................. | H05B 47/105 |
| 2023/0218363 A1* | 7/2023 | Stroelin | ............... | H05B 45/10 |
| | | | | 600/249 |

FOREIGN PATENT DOCUMENTS

| | | |
|---|---|---|
| DE | 102014222794 A1 | 5/2016 |
| DE | 102020114425 A1 | 12/2021 |
| WO | 2021239875 A1 | 12/2021 |
| WO | 2022173625 A1 | 8/2022 |

* cited by examiner

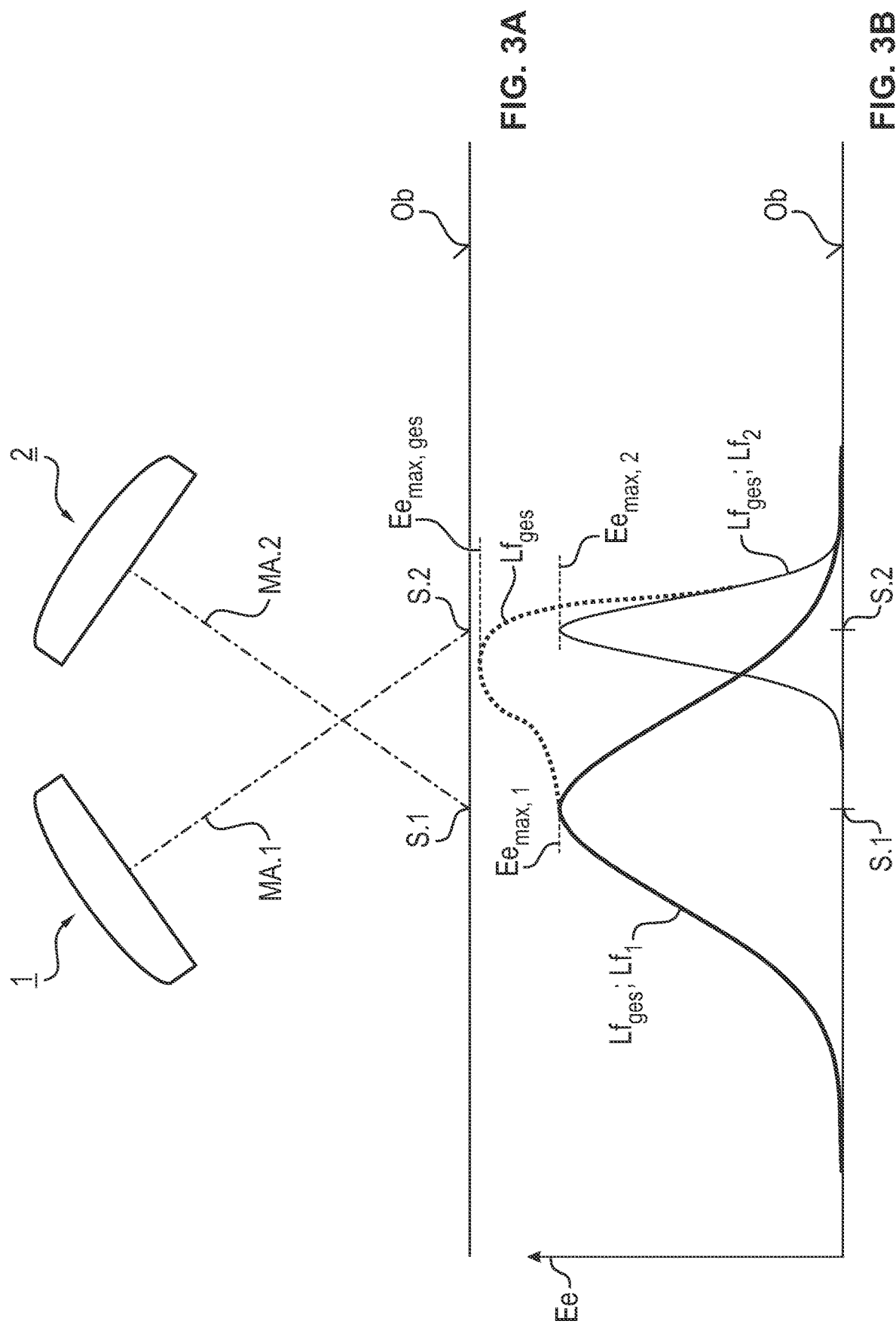

ILLUMINATION DEVICE AND ILLUMINATION PROCESS WITH LIMITATION OF MAXIMUM IRRADIANCE

CROSS REFERENCE TO RELATED APPLICATIONS

This application claims the benefit of priority under 35 U.S.C. § 119 of German Application 10 2022 122 413.9, filed Sep. 5, 2022, the entire contents of which are incorporated herein by reference.

TECHNICAL FIELD

The invention relates to an illumination device (lighting device) and an illumination process.

BACKGROUND

Such an illumination device and such an illumination process are used, for example, to illuminate an operating table. On this operating table a patient lies who is being medically treated. The illumination enables an attending physician to perform the medical treatment while having a good view of the area of the patient's body to be treated.

The illumination inevitably supplies the patient's body with radiant energy and thereby heats the patient's body. If the illumination is too strong, there is a risk that the patient's tissues will dry out and/or the patient will suffer burn injuries.

The IEC 60601-2-41 standard, currently the $3^{rd}$ ed, applies to illumination devices capable of illuminating an operating table. This standard specifies that the maximum irradiance of an illumination unit of a medical illumination device shall not exceed 1000 W/m^2 currently, 700 W/m^2 in the future. This requirement applies at any distance between the illumination device and the operating table, measured along the center axis of the illumination device, and at any time.

SUMMARY

It is an object of the invention to provide an illumination device and an illumination process which reduce with a relatively high reliability the risk of the object, for example the patient, being endangered by the illumination.

The task is accomplished by an illumination device having illumination device features according to the invention and by an illumination process having illumination process features according to the invention. Advantageous embodiments of the illumination device according to the invention are, as far as useful, also advantageous embodiments of the illumination process according to the invention and vice versa.

The following are initial definitions of some terms for medical illumination units (lighting units), that will be used below.

An illumination unit comprises at least one light source, preferably multiple light sources, wherein the light sources are attached to a support (carrier) and are preferably implemented as LEDs. In one implementation, during operation the position and orientation of a light source is invariable relative to the position and orientation of the or each other light source of the same illumination unit. It is also possible that a controllable actuator is associated with at least one light source, in particular an assembly with multiple light sources, wherein the actuator can move this light source or assembly relative to the support and thus also relative to the or at least one other light source.

The light source or each light source emits a respective light beam, which usually has the shape of a cone. In one implementation, the tip of this cone is ideally located in the light source. It is also possible that an optical system influences the shape of the light beam. A special case is a cylindrical light beam. The light beams achieved by the light sources of an illumination unit usually overlap. An illumination unit has an optical center axis, which often coincides with the geometric center axis of the support.

The illumination unit has a spectral composition of the emitted light. This spectral composition of the illumination unit results from the spectral compositions of the light from the individual light sources and is referred to below as the "light spectrum" of the illumination unit. A color temperature is correlated with the light spectrum.

Illuminance" (Ev) describes the luminous flux per unit area impinging on a surface. The SI unit is Lux=Lumen/m^2. In a plane perpendicular to the optical center axis of an illumination unit, the illuminance of the illumination unit typically takes the maximum value at the intersection of the optical center axis with this plane. As a rule, this maximum illuminance value varies along the optical center axis, namely as follows: starting from the illumination unit, this maximum value increases until it reaches a maximum, and then decreases again. The value at this maximum is called the "maximum illuminance in space" of the illumination unit. Usually, the maximum illuminance in space occurs on the optical center axis. The area where the illuminance takes the maximum value may be on an illuminated surface or between the surface and the illumination unit. If the surface were transparent, this area could also lie behind the illuminated surface in the direction of radiation provided the distance is sufficiently small.

As a rule, the maximum illuminance in space that an illumination unit can achieve is known due to the configuration and construction of the illumination unit or due to measurements performed before the first use, in particular due to the illuminances of the light sources and the positionings of the generated light beams relative to each other. By the construction of the illumination unit or by measurements performed in advance, it is further known how the maximum value of the illuminance on the optical center axis depends on the distance. This functional dependence of the illumination intensity on the distance can depend on further adjustable or configuration-related parameters of the illumination unit.

Often, a user can cause the actual maximum illuminance in space to be less than the maximum achievable illuminance in space by means of a user specification (user input/setting). The actual maximum illuminance can be changed by the user, and also can be changed automatically by a control unit by means of a control. In the following, we will refer to the "maximum achievable" and the "maximum currently achieved" illuminance in space. The maximum currently achieved illuminance is less than or equal to the maximum achievable illuminance in space. The maximum illuminance actually achieved on the surface usually depends on the position and orientation of the illumination unit relative to the illuminated surface, while the maximum illuminance achievable in space depends neither on the position nor on the orientation.

Often, a user can set the maximum illuminance of an illumination unit and change it during operation. In one implementation, the user can set the maximum currently achieved illuminance in space. In another implementation, the user can set the maximum currently achieved illuminance at a predetermined reference distance from the illumination unit. In the case of surgical lights, this reference distance is often 1 m. The maximum illuminance achieved at the reference distance is equal to or less than the maximum illuminance achievable at the reference distance. Frequently, the maximum illuminance in space of a medical illumination unit is achieved at a distance differing by about no more than 10 cm from the reference distance.

When the illumination unit illuminates a surface of an object, such as an operating table or a patient on the operating table, the illuminance varies across the illuminated surface. Ideally, the illuminance that the illumination unit achieves on the illuminated surface assumes a maximum value at some point. This maximum value is referred to as the maximum illuminance that the illumination unit actually achieves on the illuminated surface. This maximum value is equal to or less than the maximum illuminance in space of the illumination unit. As a rule, it is assumed that the maximum value occurs at the intersection of the optical center axis of the illumination unit with the illuminated surface, even if the illuminated surface is curved, which is the case with an illuminated patient, and/or is oblique to the center axis.

In the following, the term "the distance" between an illumination unit and an illuminated surface is used. Unless explicitly stated otherwise, this distance means the distance along the optical center axis between the illumination unit and the illuminated surface, even if the smallest distance between the illumination unit and the illuminated surface occurs outside the optical center axis.

Illuminance is the most important influencing factor describing the brightness of an illuminated surface.

In the case of a medical illumination unit, "the illuminance" often refers to an illuminance at a reference distance of, for example, 1 m between the illumination unit and the illuminated surface, with the illuminated surface being perpendicular to the center optical axis of the illumination unit. Often, the illumination unit is configured so that ideally the maximum illuminance in space occurs on the optical center axis and at the reference distance from the illumination unit. In practice, this goal can usually not be achieved exactly.

The luminance in $Cd/m^2$ describes how bright a surface that is illuminated by itself and/or due to reflection appears to an observer. If the surface does not luminate by itself, the luminance depends on the illuminance on the surface and on the reflection/absorption behavior of the surface.

Irradiance (Ee) is the power per unit area of light radiation impinging on a surface. The SI unit is $W/m^2$. Irradiance is also referred to as "radiant intensity" or as "radiant flux density", obsolete as "radiant current density". The irradiance of an illumination unit at a point is proportional to the illuminance at that point, with the proportionality factor depending on the light spectrum of the illumination unit. Therefore, if the proportionality factor remains constant, the maximum irradiance and the maximum illuminance in space occur in the same area.

Corresponding to the illuminance, the term "maximum irradiance" generated by an illumination unit on an illuminated surface is accordingly used. This maximum irradiance also typically reaches its maximum value at the intersection of the optical center axis of the illumination unit with the illuminated surface. The maximum value is also referred to as "peak irradiance".

The light field diameter $d_x$ is understood to be the diameter of a circle around the area of maximum illuminance, this circle being defined so that an average value over the respective illuminance in different points of this circle is equal to x % of the maximum illuminance in the plane of this circle. For example, the points are evenly distributed over the circle. The plane of this circle is perpendicular to the optical center axis of the illumination unit. Typical values for x in the medical field are 10% and 50%. For surgical lights, $d_{10}$ is usually between 13 cm and 35 cm. Because the light field diameter $d_x$ usually depends on the distance between the illumination unit and the plane of this circle, the light field diameter $d_x$ is referred to a reference distance, which is often 1 m in medical applications. In many cases, a user specification can cause the light field diameter $d_x$ to be set to a desired value. Note: Because irradiance is proportional to illuminance, the same light field diameter $d_x$ results when the light field diameter $d_x$ is referenced to irradiance instead of being referenced to illuminance.

In the medical field, it is often desired or even required by a standard, for example by the IEC 60601-2-41 standard for surgical lights, that $2*d_{50}>d_{10}$ should apply to an illumination unit. This requirement results in a boundary condition for how the light beams of the light sources of an illumination unit are positioned relative to each other.

A "light field" is the area on a surface of an object that an illumination unit illuminates. Two properties of a light field are the illuminance profile and the irradiance profile. These two profiles assign a respective illuminance and irradiance to each point on the illuminated surface, respectively. These two profiles differ from each other only by a proportionality factor, where this proportionality factor depends on the light spectrum of the illumination unit.

As a rule, when the illuminated surface is a plane, the curve on the illuminated surface in which the illuminance and irradiance are x % of the maximum illuminance and irradiance, respectively, has the shape of an ellipse, especially a circle, around the point of maximum illuminance and irradiance, respectively. In a three-dimensional representation, where the illuminated surface extends in the x-y plane and the respective illuminance or irradiance at a point (x, y) is plotted on the z-axis, the light field often has approximately the shape of a bell curve that is rotationally symmetrical to the z-axis.

The illuminance, irradiance, light field, and light field diameter of an illumination unit can of course vary over time, especially due to the actions of a user, in particular if the user moves the illumination unit. Unless otherwise noted, the respective current value is meant.

When light impacts on a body, the body absorbs a portion of the light and reflects the rest. The "heat energy", also called thermal energy, has the unit Joule. The input of thermal energy to an illuminated body is the integral of the absorbed irradiance over the illuminated area and over time, namely over the time that the object is illuminated. An illuminated body, for example a patient on an illuminated operating table, receives an input of thermal energy from an illumination device that illuminates the operating table, optionally an input of thermal energy from other energy sources, for example a heater for the operating table, a radiant heater, and ambient temperature. The body emits heat energy to the environment, in particular depending on its body temperature and the ambient temperature. After a transient phase, a thermal equilibrium is established in which the input of thermal energy equals the output of thermal energy. Often, the patient's body temperature rises slightly, and the rise establishes this thermal equilibrium.

On the one hand, it is desired to well illuminate that area of the patient's body where medical treatment takes place. This is achieved by a high luminous intensity and/or illuminance. However, a high illuminance also leads to a high maximum irradiance. On the other hand, in order not to endanger the patient, the maximum total irradiance should therefore not be too high. If the maximum total irradiance on the illuminated surface of the patient is too high, burn injuries and/or desiccation may occur.

As a rule, a medical operating light (surgical light) causes an input of thermal energy of 50 W or less. However, the term "heat energy" describes a load on a patient's body averaged over space and time due to an illumination. However, especially in a medical application, an area of the body is often heavily illuminated so that a physician can safely perform a medical procedure. This can result in a high local exposure of the body due to a supply of radiant power. The thermal equilibrium described above therefore occurs much later in this area than averaged over the entire body. In addition, the irradiance can change rapidly, especially when a surgical light is turned up. One consequence is that considerably higher temperatures are reached in this area or in a smaller part of the body than in the rest of the body. These temperature differences often cannot be effectively and rapidly compensated for either by processes in the patient's body itself or by releasing heat into the environment. This can result in a wound being partially dried out, an area of the body being locally heated, and, in extreme cases, even minor burns can occur. Therefore, according to the invention, not or at least not only the heat energy as defined in the previous paragraph is limited.

The invention reduces the risk of a patient being harmed by excessive maximum total irradiance from the illumination device. The maximum total irradiance is an indicator of the actual radiant power that the illumination device exerts locally and currently on the patient's body. This distinguishes maximum total irradiance from thermal energy, which is in some sense averaged over the patient's body and integrated over time.

The illumination device according to the invention comprises at least two illumination units, each illumination unit being capable of illuminating the same surface. Therefore, in many cases, the illuminated surface and thus an object on the illuminated surface is illuminated from multiple sides, which is often not possible with a single illumination unit. This feature reduces the effect of shadowing caused by an object when the object comes into the area between the illumination device and the illuminated surface. Such an object is, for example, a medical instrument or a body part of a treating physician.

Preferably, the respective position and orientation of each illumination unit relative to the illuminated surface can be changed, independently of the respective position and orientation of the or each other illumination unit of the illumination device. One limitation: of course, two illumination units cannot penetrate each other, and an illumination unit cannot penetrate any other object.

The illumination device according to the invention thus comprises at least two illumination units. Each illumination unit emits light and generates a light field and thus an irradiance on the illuminated surface, for example on the illuminated surface of the patient or of the operating table. Of course, it is possible that at least one illumination unit is switched off at any one time.

The light fields of the illumination units superimpose additively. The "total irradiance" of the illumination device is understood to be the irradiance that the illumination device currently achieves through its illumination units in total on the illuminated surface. Also, the total irradiance assumes a maximum on the illuminated surface, denoted by the "maximum total irradiance", and may vary with time. The maximum total irradiance depends on the maximum irradiances achieved by the illumination units of the illumination device on the illuminated surface, and usually on the positions of the light fields relative to each other on the illuminated surface, and to a lesser extent on the light field diameter and/or the correlated color temperature.

The illumination device according to the invention further comprises a signal processing control unit. The control unit is configured to control each illumination unit independently of the other illumination unit or each other illumination unit of the illumination device. An objective and thus an effect of the control is to change, in particular to reduce, the maximum irradiance of the controlled illumination unit. Optionally, the control unit is able to change by control the light field diameter and/or the correlated color temperature of the illumination unit.

As a rule, each illumination unit comprises several individual light sources, in particular LEDs. Preferably, each illumination unit comprises at least two groups of light sources, each light source group comprising at least one light source. Preferably, the control unit is able to control each light source group independently of the or any other light source group of the illumination unit, and the control changes the maximum irradiance of this light source group. It is also possible that the light sources of an illumination unit can only be controlled together (jointly), i.e. that all light sources of an illumination unit belong to the same light source group.

Each individual light source and thus each light source group generates a respective maximum irradiance on the surface. To change the maximum irradiance of the controlled illumination unit, the control unit causes the respective maximum irradiance of at least one light source group to be changed.

In order to change the maximum irradiance of a light source group, the control unit causes a different value to be assigned to a light intensity parameter of the light source group. In one implementation, the control unit causes the maximum irradiance in space that the light source group is capable of generating to be changed by the control. In another implementation, the control unit, by controlling the light source group, causes the light field diameter or the light spectrum generated by the light source group, with which spectrum a color temperature is correlated, to be changed. These implementations can be combined with each other.

Preferably, an illumination unit comprises at least two different light source groups that can be controlled independently of each other. In one embodiment, the control unit causes that the light intensity parameter of at least one light source group is assigned a different value of, while at least one other light source group remains unchanged. In another embodiment, the values of the light intensity parameters are changed in the same way, for example by the same factor or by the same absolute amount.

The illumination device according to the invention is capable of capturing (acquiring/detecting) a user specification (input setting). This user specification concerns (refers to/specifies) the maximum total irradiance of the illumination device or the maximum irradiance of at least one illumination unit. "Concerning" means: the user specification causes or is at least suitable to change the maximum total irradiance or the maximum irradiance. In particular, the user specification may concern the maximum irradiance in space to be achieved, optionally the light field diameter or the correlated color temperature of the illumination device or illumination unit. The user preset (user specification/user setting) can specify a value for this parameter or also include a preset to change the current value, for example with the help of a slider or with the help of a plus button and a minus button.

The control unit is configured to automatically respond to capturing the user specification (user input setting) as follows:

The control unit predicts, at least approximately, the maximum total irradiance that the illumination device will achieve on the surface provided the illumination device is operated according to the user specification. Preferably, the control unit makes the prediction under the assumption that the illumination device is changed according to the user specification and is otherwise operated unchanged, in particular that the respective distance between each illumination unit and the illuminated surface remains unchanged. In general a further assumption is that besides the user specification no irradiance is changed. Usually, the maximum total irradiance predicted by the control unit is an estimate of the maximum irradiance on the surface that would actually result from the execution of the user specification.

An upper threshold (upper limit) is set for the maximum total irradiance that the illumination device actually achieves or may achieve on the surface. This upper threshold can be specified in particular by a user or by a higher-level control system. If the upper threshold is exceeded, there is a risk that an illuminated person will be injured or otherwise harmed. In one embodiment, this upper threshold is fixed and cannot be changed. In another embodiment, a maximum possible upper threshold is fixed, for example due to legal requirements or due to a specification by a manufacturer of the illumination device or enterprise using the illumination device. A user by making a corresponding user specification or also a higher-level control can cause a lower upper threshold actually to be used. The control unit captures (detects) the fixed upper threshold, or the upper threshold specified by the user or the higher-level control system.

The control unit compares the predicted maximum total irradiance with this specified upper threshold. If the predicted maximum total irradiance is greater than the upper threshold, the control unit controls (actuates) at least one illumination unit of the illumination device. This actuation depends on the captured (acquired) user specification. Preferably, an objective of the control is that the user specification is implemented as desired or at least as far as possible. During the actuation, the control unit causes the following boundary condition (constraint) to be observed: after the control the maximum total irradiance the illumination device actually achieves is less than or equal to the specified upper threshold. In general, the actuation depends on the user specification and the predicted maximum total irradiance. A special case is that the control unit leaves the illumination device unchanged, because an even partial execution of the user's specification would lead to the upper threshold being exceeded.

Ideally, the control unit thus ensures that the specified upper threshold is not exceeded by implementing a user specification as desired by the user. "Ideally" means that the prediction is an estimate that may deviate from reality and that the control unit preferably uses signals from sensors for the prediction, which signals may also be erroneous. Because ideally the upper threshold is maintained, the risk of an illuminated patient being injured by a maximum irradiance being too great, or the eyes of a nearby person being overloaded, or an object being damaged is reduced.

The invention avoids the need for the user himself or herself to ensure that the upper threshold is not exceeded during presetting a user specification. This is especially true for a user specification that does not directly preset a value or an increase of the maximum total irradiance, but of another parameter that affects the maximum total irradiance, for example the maximum irradiance of an illumination unit or a light field diameter.

It is possible that the illumination device comprises an input unit with which the user can change the maximum total irradiance. This input unit may be configured in such a way that the user cannot increase the maximum total irradiance beyond the upper threshold. The invention can be combined with such an embodiment. However, the invention allows the user to change other parameters of the illumination device, for example, the maximum irradiance of an illumination unit or a light field diameter or a correlated color temperature. According to the invention, the control unit also prevents in this case the upper threshold for the maximum total irradiance from being exceeded, without the need for the input unit to be configured accordingly and without the user having to pay attention to compliance with the upper threshold.

In one embodiment, the control unit subsequently (afterwards) calculates the maximum total irradiance that the illumination device actually achieves on the surface as a whole. This embodiment is described in more detail below. According to the invention, the control unit additionally or instead predicts a maximum total irradiance that would result from the user specification if the user specification were implemented as desired. If this implementation would cause the upper threshold to be exceeded, the control unit prevents the upper threshold from actually being exceeded by controlling at least one illumination unit accordingly. A special case is that the control unit leaves the illumination device unchanged, i.e. does not implement the user specification, because otherwise the upper threshold would be exceeded. The invention thus prevents the undesirable event that the upper threshold is first exceeded, this event is subsequently detected, and subsequently the maximum total irradiance is reduced again. Such an effect could in particular endanger a patient and/or strain or tire the eyes of a person in the vicinity of the illuminated surface.

The invention can be operated in combination with an embodiment in which the control unit continuously determines the current maximum total irradiance actually achieved, for example with a fixed sampling frequency. In this embodiment, how quickly an exceedance of the upper threshold is detected depends on the respective sampling frequency of the control unit and that of optional sensors, and also on the computing capacity of the control unit. Thanks to the invention, however, this continuous sampling is not necessary. Rather, the maximum total irradiance is predicted on demand, namely after a user specification is acquired. In some cases, this feature saves computing capacity and/or computing time of the control unit.

The following embodiment is possible: if the predicted maximum total irradiance is greater than the upper threshold, the control unit causes a corresponding message, in particular an alarm, to be output in at least one form perceptible by a human being. However, because according to the invention the control unit automatically activates at least one illumination unit when the upper threshold is exceeded, the invention obviates the need to output such a message. This is particularly advantageous because, especially in everyday clinical practice, persons are frequently overwhelmed with many messages. The invention thus reduces the risk that the maximum total irradiance is exceeded significantly or for a longer period of time because a user does not perceive a corresponding message or does not react correctly to such a message. It is possible that the control unit controls at least one illumination unit and additionally causes the message to be output.

According to the invention, the control unit predicts the maximum total irradiance that the illumination device would achieve on the illuminated surface if the user specification were implemented as desired. According to the invention, the control unit uses the captured user specification concerning the maximum total irradiance or the maximum irradiance of at least one illumination unit. Different embodiments are possible as to what further information the control unit uses to predict the maximum total irradiance. The invention can also be implemented without this further information.

Preferably, the control unit determines and uses the respective maximum irradiance of each illumination unit, whereby the illumination unit actually achieves this maximum irradiance on the illuminated surface. Typically, the control unit uses an approximate value for the actual maximum irradiance.

In one implementation, a maximum irradiance achievable in space is specified for each illumination unit. Due to its configuration and construction, the illumination unit is able to achieve at most this irradiance, whereby this maximum does not necessarily occur on the illuminated surface, but for example at a reference distance of 1 m. The maximum irradiance in space that the illumination unit actually achieves is less than or equal to the maximum irradiance in space that can be achieved and depends on the control of the illumination unit. The maximum irradiance achieved on the surface, in turn, is less than or at most equal to the maximum irradiance achieved in space.

In one embodiment, the control unit uses the maximum irradiance which an illumination unit actually achieves in space as the maximum irradiance achieved on the surface and determines the maximum irradiance achieved in space as a function of the maximum achievable irradiance and the control of the illumination unit. The maximum irradiance approximated in this way can be greater than the maximum irradiance actually achieved on the surface, but usually not smaller.

In another embodiment, it is taken into account that the maximum irradiance that an illumination unit achieves on the illuminated surface depends on the distance between the illumination unit and the surface and may therefore be smaller than the maximum irradiance in space that the illumination unit achieves. According to this other embodiment, the illumination device comprises at least one distance sensor. In one embodiment, a respective distance sensor is connected to each illumination unit, and the position and orientation of the connected distance sensor relative to the illumination unit cannot be changed (the unit is fixed). The distance sensor or each distance sensor measures an indicator of the distance between itself and the illuminated surface. In many cases, this measured distance can be used as the distance between the illumination unit and the illuminated surface. Optionally, a lateral offset between the distance sensor and the optical center axis of the illumination unit is also used; this lateral offset is predetermined by the configuration and is invariant during operation. The control unit uses the maximum irradiance achieved in space and the measured distance to determine the maximum irradiance achieved on the surface.

Different implementations of this distance sensor are possible. In one implementation, the distance sensor emits electromagnetic radiation or sound waves towards the surface, the surface reflects at least a part of the electromagnetic radiation or sound waves, a portion of it impinges on the distance sensor again, and the time-of-flight (transit time) of the electromagnetic radiation or sound waves is measured. The time-of-flight is an indicator of the distance being sought. It is also possible to measure the attenuation, the attenuation being an indicator of the distance.

In another implementation, the illumination unit is connected to a camera that is directed to the surface and includes an autofocus function. This autofocus function automatically focuses the camera on the illuminated surface. The distance sensor detects at which distance the autofocus function has focused the camera. This autofocus distance is an estimate of the distance being sought. This embodiment eliminates the need to provide a separate distance sensor. In many cases, such a camera is already present, for example to allow the illuminated surface to be visually displayed on a spatially distant output unit.

In one implementation, the camera is positioned and configured in such a way that at least one image of the camera shows all or at least some light fields that the illumination units generate on the surface. The control unit evaluates this image and determines how large each light field in this image is. In addition, the control unit detects for each illumination unit which light field diameter $d_x$ this illumination unit has at a predetermined reference distance, for example by read access to a data memory. The light field diameter $d_x$ at the reference distance is a configuration-related parameter that a user can change, but it does not depend on the distance that is to be determined. The control unit compares the sizes of the light fields in the image with the light field diameters at the reference distance and derives the respective distance from the result of the comparison. The reference distance is, of course, specified (given) to the control unit.

The image described above alone involves multiple light fields on the surface, assuming multiple illumination units are turned on. In one embodiment, the control unit automatically determines which light field originates from which illumination unit. In many cases, the camera is fixed to an illumination unit. The control unit captures the unchanging position and orientation of the camera relative to the center optical axis of the illumination unit. In one embodiment, at least one illumination unit is fixedly connected to a distance sensor. The measured distance between this illumination unit and the surface, the light field diameter $d_x$ of this illumination unit and the diameters of the light fields in the image enable in many cases the control unit to identify the light field originating from the illumination unit with the distance sensor.

It is possible that the control unit of at least one illumination unit without distance sensor captures the set light field diameter at a reference distance and determines by an automatic plausibility check which light field in the image can originate from this illumination unit and which cannot.

In a preferred embodiment, the distance sensor is able to scan the illuminated surface without contact and thereby generate a topographic 3D profile of the illuminated surface. Such a distance sensor has become known as a "time-of-flight sensor" and is described, for example, in DE 10 2013 012 231 A1 (corresponding U.S. Pat. No. 9,491,835 (B2) is incorporated by reference) and DE 10 2012 014 716 A1 (corresponding U.S. Pat. No. 9,504,113 (B2) is incorporated by reference). The control unit uses this topographic profile to determine the maximum irradiance of the connected illumination unit, the maximum total irradiance, and/or the distance between the illumination unit and the surface.

In one embodiment, the control unit uses the topographic profile to determine the smallest distance between the topographic profile of the illuminated surface and the illumination unit. This smallest distance may be less than the distance along the optical center axis. The control unit uses this smallest distance as well as the maximum irradiance in space of the illumination unit to determine the maximum irradiance on the surface of the illumination unit. It is also possible that the control unit derives and uses an averaged distance from the topographic profile.

According to the embodiment just described, the control unit determines the maximum irradiance that an illumination unit achieves on the surface depending on
    the irradiance that the illumination unit achieves in space, and
    the measured distance between the illumination unit and the illuminated surface.

Preferably, the control unit uses a characteristic curve which specifies a factor as a function of the distance, this factor indicating which percentage of the maximum irradiance achievable in space is actually maximally achievable by the illumination unit at this distance. This characteristic curve is known by the configuration of the illumination unit or is empirically determined in advance. The characteristic curve is preferably stored in a data memory to which the control unit has at least temporary read access.

In one embodiment, the control unit predicts the maximum total irradiance as follows: as the sum of the maximum irradiances of the illumination units, wherein if the user specification refers to an illumination unit, the maximum irradiance to be achieved according to this user specification is used. The maximum irradiance is derived from the maximal achievable maximum irradiance and the control (actuation) of an illumination unit. Preferably, this summation does not take into account those illumination units that are switched off or defective. This embodiment does not require a signal from a sensor, especially not a measured distance, but may result in predicting a maximum total irradiance that is too large, but not in predicting one that is too small.

Each illumination unit achieves a light field on the illuminated surface. The term "light field" has already been defined above. If the illuminated surface is perpendicular to the center optical axis of the illumination unit, then an irradiance of more than x % of the maximum irradiance occurs inside a circle, where x is 10%, for example, and where the center of this circle is the point of intersection of the center optical axis with the surface. The diameter of this circle is the light field diameter $d_x$. The circles from the illumination units can be arranged concentrically, and in this case the maximum total irradiance is ideally equal to the sum of the maximum irradiances of the illumination units. If, on the other hand, the centers of these circles do not coincide, this sum is usually greater than the maximum total irradiance.

In one embodiment, the control unit is able to determine, at least approximately, how the light fields are positioned relative to each other. The illumination units generate these light fields on the illuminated surface. To predict the maximum total irradiance, the control unit uses the captured user specification, the maximum irradiances of the illumination units, and additionally the determined positionings of the light fields relative to each other.

Various embodiments are possible as to how the control unit determines how the light fields of the illumination units are positioned relative to each other. In these embodiments, the control unit preferably in particular determines the distance between the two intersections of the two optical center axes of two illumination units with the illuminated surface. In the case of two illumination units, there is one such distance, in the case of three illumination units, there are three such distances, and in the case of four illumination units, there are already six such distances, provided that all illumination units are switched on simultaneously and are taken into account in the prediction and in the optional determination of the maximum total irradiance. A distance between two intersections can, of course, be equal to zero.

It is possible that each illumination unit is connected to a respective distance sensor and a respective orientation sensor. The distance sensor indicates an indicator for the distance between the illumination unit and the illuminated surface. The orientation sensor indicates how the optical center axis of the illumination unit is positioned in space. The control unit uses signals from these two sensors to determine how the light fields are positioned relative to each other.

In one embodiment, the two or at least two illumination units are each connected to a distance sensor. The position and orientation of the distance sensor relative to the connected illumination unit is unchangeable (fixed). Each of the at least two distance sensors is capable of scanning in a contactless manner the illuminated surface. The distance sensors provide at least two 3D topographic profiles of the illuminated surface, and in many cases the profiles are from different viewing directions. The control unit compares the topographic profiles to each other and uses the result of this comparison to determine how the light fields of the illumination units are positioned relative to each other on the surface. Preferably, the control unit additionally uses the configuration-related position and orientation of the distance sensor on an illumination unit relative to the center optical axis of the illumination unit to derive the position and orientation of the center optical axis relative to the topographic profile. Preferably, the control unit derives the respective distance between the intersections of the optical center axes with the surface and uses the comparison of the two topographic profiles for doing so. In many cases, the control unit is also able to determine the position of a third light field relative to the first two light fields, even if this third light field originates from an illumination unit that is not connected to such a distance sensor.

According to the invention, the control unit is configured to control each illumination unit of the illumination device independently of the other illumination unit or each other illumination unit. According to one implementation, the control unit is able to control the illumination units in a measurement period as follows: in a first alternative, at any time during the measurement period, exactly one illumination unit is switched on, and the or each other illumination unit is switched off. In a second alternative, at any time during the measurement period, exactly one illumination unit is switched off and the other illumination unit or each other illumination unit is switched on. This measurement period is used to determine how the light fields of the illumination units are positioned relative to each other. Preferably, the frequency at which the illumination units are switched on and off is such that a human does not perceive flickering, but rather continuous illumination of the surface.

According to this other implementation, the illumination device comprises an image acquisition system. The image acquisition system comprises at least one camera. In one implementation, a respective camera is arranged at each illumination unit. The image acquisition system is capable of generating a sequence of images of the illuminated surface. The respective light field of each illumination unit is in the field of view of at least one camera of the image capturing system, respectively. The sequence is generated as follows: for each illumination unit, the sequence comprises at least one respective image of the illuminated surface, this image having been generated while, in the first alternative, this illumination unit is switched on and, in the second alternative, this illumination unit is switched off. This image thus shows only the light field of this illumination unit in the first alternative and only the respective light field of the other illumination unit or each other illumination unit in the second alternative. The sequence thus comprises at least as many images as the illumination device comprises illumination units. Each image of this sequence is provided with a respective time stamp (time of generating the image).

The control unit evaluates the sequence of images. Preferably, the control unit computationally superimposes the images of the sequence. The control unit uses the images with the time stamps, as well as the times at which each illumination unit is switched on or off, to determine which light field on the surface originates from which illumination unit. In turn, the control unit uses this information to determine how the light fields are positioned relative to each other.

Thanks to this embodiment, the positioning of the light fields can be determined even if all illumination units emit light with the same light spectrum. Furthermore, it is possible, but thanks to this embodiment not necessary, to measure the respective position and orientation of each illumination unit in space.

In one application, this embodiment can additionally be used to determine the distance between an illumination unit and the illuminated surface. The size of this light field in the image as well as the light field diameter at the reference distance of this illumination unit provide an estimate of the distance between this illumination unit and the surface.

As explained above, the irradiance of an illumination unit is proportional to the illuminance, with the proportionality factor depending on the light spectrum of the illumination unit. In one embodiment, the control unit determines the respective light spectrum of each illumination unit. The light spectrum of an illumination unit depends on the configuration-related light spectra of the above-mentioned light source groups of this illumination unit as well as on the respective maximum irradiance of this light source group. The control unit uses the determined light spectra to predict the maximum total irradiance and optionally to determine the maximum total irradiance actually achieved.

The maximum irradiance of an illumination unit may additionally depend on the angle at which the optical center axis of the illumination unit intersects the illuminated surface. In one embodiment, the control unit determines the respective angle for each illumination unit and uses the determined angles to predict the maximum total irradiance and optionally to determine the maximum total irradiance actually achieved.

According to the invention, the control unit predicts the maximum total irradiance in response to the capturing (acquisition, detection) of a user specification. If the predicted maximum total irradiance is greater than the specified upper threshold, the control unit controls at least one illumination unit, thereby preventing the upper threshold from being exceeded, or at least significantly exceeded.

Different embodiments are possible as to how the control unit causes the upper threshold not to be exceeded by means of the actuation.

In one embodiment, the user specification relates to the maximum total irradiance. For example, the user specifies that the maximum total irradiance to be achieved should be increased. In response to the capturing of this user specification, the control unit preferably controls each illumination unit—optionally with the exception of the switched-off or defective illumination units. By the control, the control unit changes the respective maximum irradiance of each illumination unit according to the user specification, in such a way that the upper threshold is not exceeded. It is possible that as a result of this specification the user specification is not implemented exactly as desired, i.e. remains smaller than desired by the user. This configuration is particularly advantageous if the maximum total irradiance already reaches or nearly reaches the upper threshold, and the user specifies an increase of the maximum total irradiance. It is even possible that the illumination device remains unchanged.

In one implementation of this embodiment, the control unit causes the respective maximum irradiance of each illumination unit to be changed by the same factor. In another implementation, the control unit causes the maximum irradiance of the illumination unit that currently achieves the greatest or alternatively the smallest maximum irradiance of all illumination units of the illumination device to be changed.

In another embodiment, the user specification relates to a particular first illumination unit selected by the user. For example, the user may wish to have a particular area on the illuminated surface more strongly illuminated, for example because a medical treatment on a patient is to be performed in or on that area. The user therefore specifies that the maximum irradiance and/or the light field diameter and/or the color temperature of a first illumination unit directed at this area is to be changed, in particular increased.

Preferably, in this other embodiment, the control unit controls the first illumination unit to which the user specification refers, thereby causing the maximum irradiance of the first illumination unit to be changed, ideally according to the user specification. If the control unit increases the maximum irradiance of the first illumination unit according to the user specification and does not change anything else, the maximum total irradiance could exceed the specified upper threshold as a consequence. According to the invention, also in this other embodiment, the control unit predicts which maximum total irradiance would be realized from the implementation of this user specification, i.e. if the maximum irradiance of the first illumination unit is changed as specified by the user.

Preferably, the control unit causes the first illumination unit to be changed according to the user's specification. If this change would cause the upper threshold to be exceeded, the control unit selects another illumination unit, controls it, and thereby causes the maximum irradiance of this other illumination unit to be reduced. The objective to be achieved by this control is that the maximum total irradiance is at most equal to the upper threshold. If the illumination device comprises at least three illumination units, it is possible that the control unit selects several other illumination units and reduces the respective maximum irradiance of these selected other illumination units.

In many cases, this embodiment makes it possible that, as desired by the user, a certain area on the illuminated surface is illuminated differently, in particular more strongly, than before, namely by the first illumination unit, and nevertheless the upper threshold is not exceeded. Preferably, the control unit selects at least one other illumination unit, wherein the light field of this other illumination unit and the light field of the first illumination unit do not overlap or overlap only relatively little. It is also possible that the control unit selects as the other illumination unit the illumination unit that currently achieves the greatest maximum irradiance among all other illumination units.

It is possible that at least a first illumination unit of the illumination device is directed to a first area of the illuminated surface, in particular to a first area of a patient on an operating table. The first area is particularly sensitive to the input of thermal energy and comprises, for example, the chest or the face of the patient. At least one other illumination unit is directed to another area that is less sensitive to thermal energy. Preferably, the respective light field of the first illumination unit or each first illumination unit and the respective light field of the further illumination unit or each further illumination unit do not overlap, or at least do not overlap substantially. Often, the upper threshold need only be kept for this first area.

In this application, it is important that the maximum total irradiance achieved by the first illumination units is less than or equal to the upper threshold. The maximum irradiances of the second illumination units are preferably not considered. This embodiment allows the first area to be illuminated as brightly as possible or as desired without exceeding the upper threshold.

In one embodiment, the control unit therefore determines an illumination unit subset, i.e. the first illumination units of the application just mentioned. The illumination unit subset comprises at least one illumination unit of the illumination device. At least one further illumination unit of the illumination device belongs to the remaining plurality, i.e. does not belong to the illumination unit subset. The control unit is capable of determining the respective maximum irradiance of each illumination unit of the illumination unit subset. In order to predict the maximum total irradiance of the illumination device, the control unit uses the captured user specification, the determined maximum irradiances of the (first) illumination units of the illumination unit subset and optionally the information how the light fields of these first illumination units are positioned relative to each other. Preferably, the control unit does not use the irradiances of the remaining (second) illumination units.

Different implementations are possible, as the control unit determines the illumination unit subset.

In one implementation, the illumination device captures a corresponding user specification. In one implementation, the user specification specifies the or each illumination unit of the illumination unit subset, and in another implementation, the or each illumination unit of the illumination device that does not belong to the illumination unit subset. In many cases, a user can reliably specify which illumination units are directed to the heat sensitive area.

Another form of implementation can be combined with the embodiment described above, in which the control unit determines how the light fields of the illumination units are positioned relative to each other. According to this combination, the control unit determines light fields that overlap. The illumination units that generate these overlapping light fields belong to the illumination unit subset. Each further illumination unit does not belong to the illumination unit subset. The light field of the or every further illumination unit therefore does not overlap with the light fields of the illumination units of the illumination unit subset.

According to the invention, the control unit predicts a maximum total irradiance in response to the event that a user specification has been captured (acquired). This user specification refers to the maximum total irradiance or to a maximum irradiance of an illumination unit. The control unit implements (executes) this user specification in such a way that the maximum total irradiance does not exceed the upper threshold. In one embodiment, the control unit is additionally able to subsequently (retrospectively) determine the maximum total irradiance actually achieved and to reduce it if necessary. The process of the control unit determining the maximum total irradiance achieved is triggered by the control unit detecting an event relevant to irradiance. This irradiance-relevant event (irradiance-changing event) changes the maximum total irradiance or is at least capable of changing it. The event has already occurred and can only be checked afterwards (subsequently), whereas according to the invention the user specification is first checked and then implemented as described above. As a rule, the irradiance-relevant event is caused by a user intervention or user action.

According to this embodiment, the control unit determines at least approximately the maximum total irradiance that the illumination device achieves on the surface after the irradiance-relevant event. If this determined maximum total irradiance is greater than the upper threshold, the control unit controls at least one illumination unit. In this way, the control unit causes the maximum total irradiance to be reduced (again). This embodiment reduces the risk that the maximum total irradiance is greater than the upper threshold for a longer period of time. Nevertheless, thanks to this embodiment, it is not necessary to continuously determine the current actual maximum total irradiance with a high sampling frequency. Rather, the maximum total irradiance is determined again at least when required, namely when an irradiance-relevant event is detected, i.e. an indication of a possible change in the actual maximum total irradiance.

In one implementation, the control unit controls all illumination units of the illumination device and causes the respective maximum irradiance of each illumination unit to be reduced, for example by the same percentage or by the same absolute amount. It is also possible that the control unit only reduces the maximum irradiances of those illumination units that do not belong to the illumination unit subset described above.

Various embodiments are possible as to which irradiance-relevant event the control unit is able to detect.

In one embodiment, the illumination device comprises at least one distance sensor, preferably one distance sensor per illumination unit. The distance sensor or each distance sensor is capable of measuring an indicator of the distance between itself and the illuminated surface. As an irradiance-relevant event, the control unit detects the event that at least one measured distance has been changed by more than a specified lower threshold, in particular has been reduced. Because the maximum irradiance of an illumination unit depends on the distance between the illumination unit and the surface, a changed distance of an illumination unit can lead to a changed maximum total irradiance.

In another embodiment, the illumination device comprises at least one touch sensor, preferably one touch sensor per illumination unit. The or every touch sensor is capable of detecting the event that a user has touched the touch sensor and thus the connected illumination unit. For example, this touch sensor is mounted on a handle of the illumination unit. A user touches the illumination unit, in particular a handle of the illumination unit, usually with the objective of changing the distance between the illumination unit and the illuminated surface and/or the orientation of the illumination unit.

According to the invention, the control unit is able to control each illumination unit independently of the or each other illumination unit, whereby the objective of this control is or can be to change the maximum irradiance of this illumination unit. By actuating, the control unit at least partially implements a user specification or responds to a user intervention. Furthermore, the control unit prevents or at least subsequently causes the maximum total irradiance to be less than or at most equal to the specified upper threshold. In one embodiment, the illumination device is configured such that the control unit strives to cause the maximum total irradiance to be no greater than the upper threshold throughout the operation of the illumination device.

In another embodiment, the illumination device can be operated in two different modes, namely with an irradiance-limiting mode activated and with the irradiance-limiting mode deactivated. With the irradiance-limiting mode activated, the control unit operates as just described, thus predicting a maximum total irradiance in response to a user specification and causing it to actually achieve maximum total irradiance less than or equal to the upper threshold. Optionally, when the irradiance-limiting mode is activated, the control unit responds (reacts) retrospectively as just described to the detection of an irradiance-related event. When the irradiance-limiting mode is deactivated, the control unit allows the maximum total irradiance to be greater than the upper threshold. In one embodiment, the control unit predicts a maximum total irradiance even when the irradiance-limiting mode is deactivated but does not control an illumination unit with the goal of ensuring that the upper threshold is not exceeded. If the maximum total irradiance is greater than the upper threshold and the irradiance-limiting mode is deactivated, the control unit preferably outputs a corresponding message in a form that can be perceived by a human.

Preferably the illumination device is capable of capturing (acquiring) a user specification that determines whether the illumination device should operate with the irradiance-limiting mode activated or deactivated. It is possible that a user activates the irradiance-limiting mode in response to being notified that the upper threshold has been exceeded. In response to this, the control unit controls at least one illumination unit with the objective of reducing its maximum irradiance.

In one application, the illumination device according to the invention is used to illuminate a medical operating table. This operating table is configured to have a patient lying on it who is to be medically treated. The illumination device can be used in particular inside a building or a vehicle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3A and FIG. 3B are schematic views showing a first example of the light fields of two illumination units and the resulting total light field;

DESCRIPTION OF PREFERRED EMBODIMENTS

Figure 1:
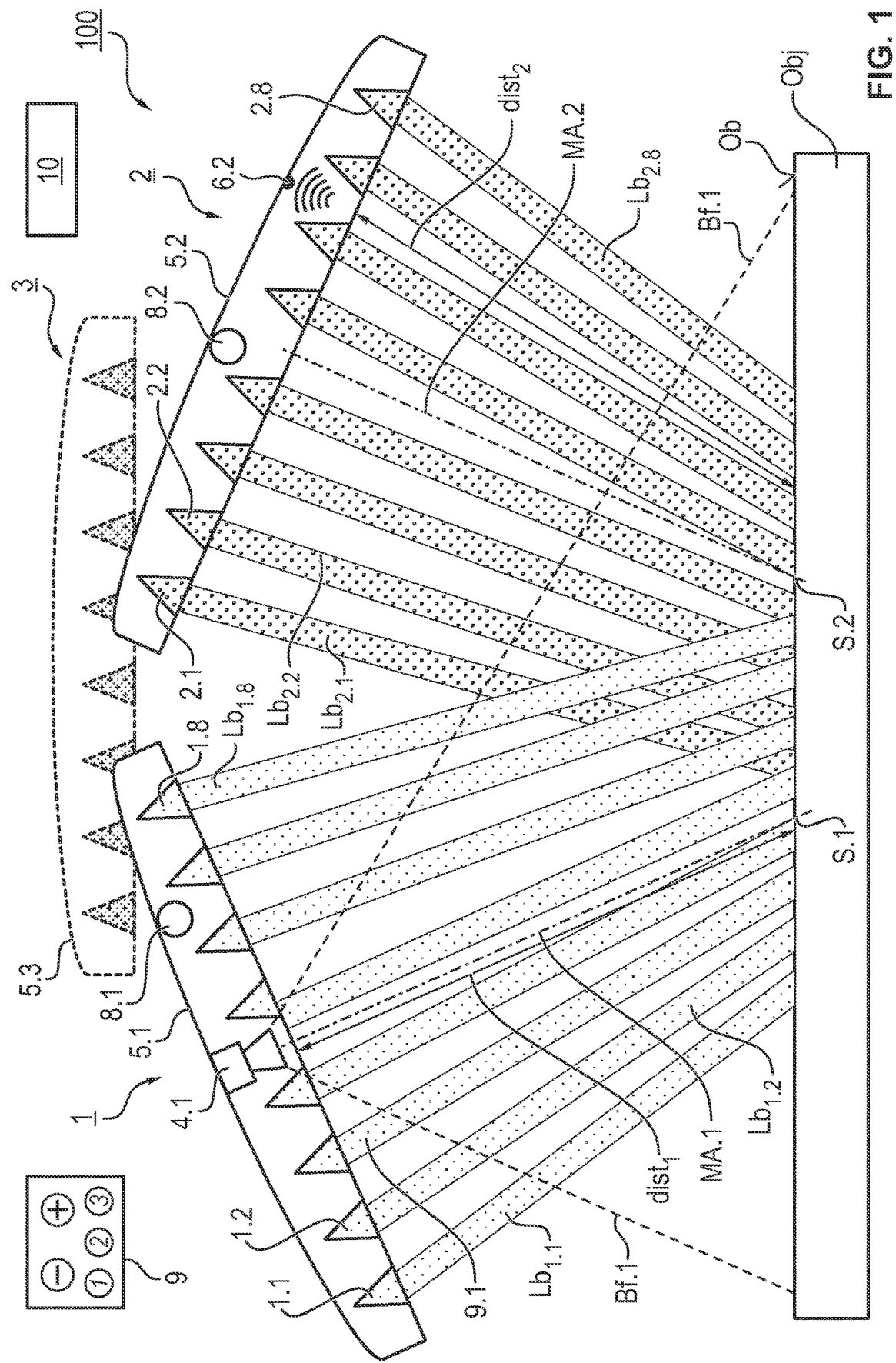
FIG. 1 is a schematic cross-sectional view of an illumination device with three illumination units and a camera.

Referring to the drawings, in the embodiment example, the invention is used for illuminating an object Obj in the form of an operating table. A patient (not shown) lies on this operating table Obj, the patient is being medically treated. The illumination device 100 according to the invention illuminates that surface Ob of the operating table Obj or of the patient on the operating table Obj which faces the illumination device 100. The illumination device 100 generates a light field on the illuminated surface Ob. In subsequent figures, a flat surface Ob is shown for simplicity. Of course, the illuminated surface of a patient on the operating table Obj is not flat. Note: The figures are not necessarily true to scale.

Figure 5:
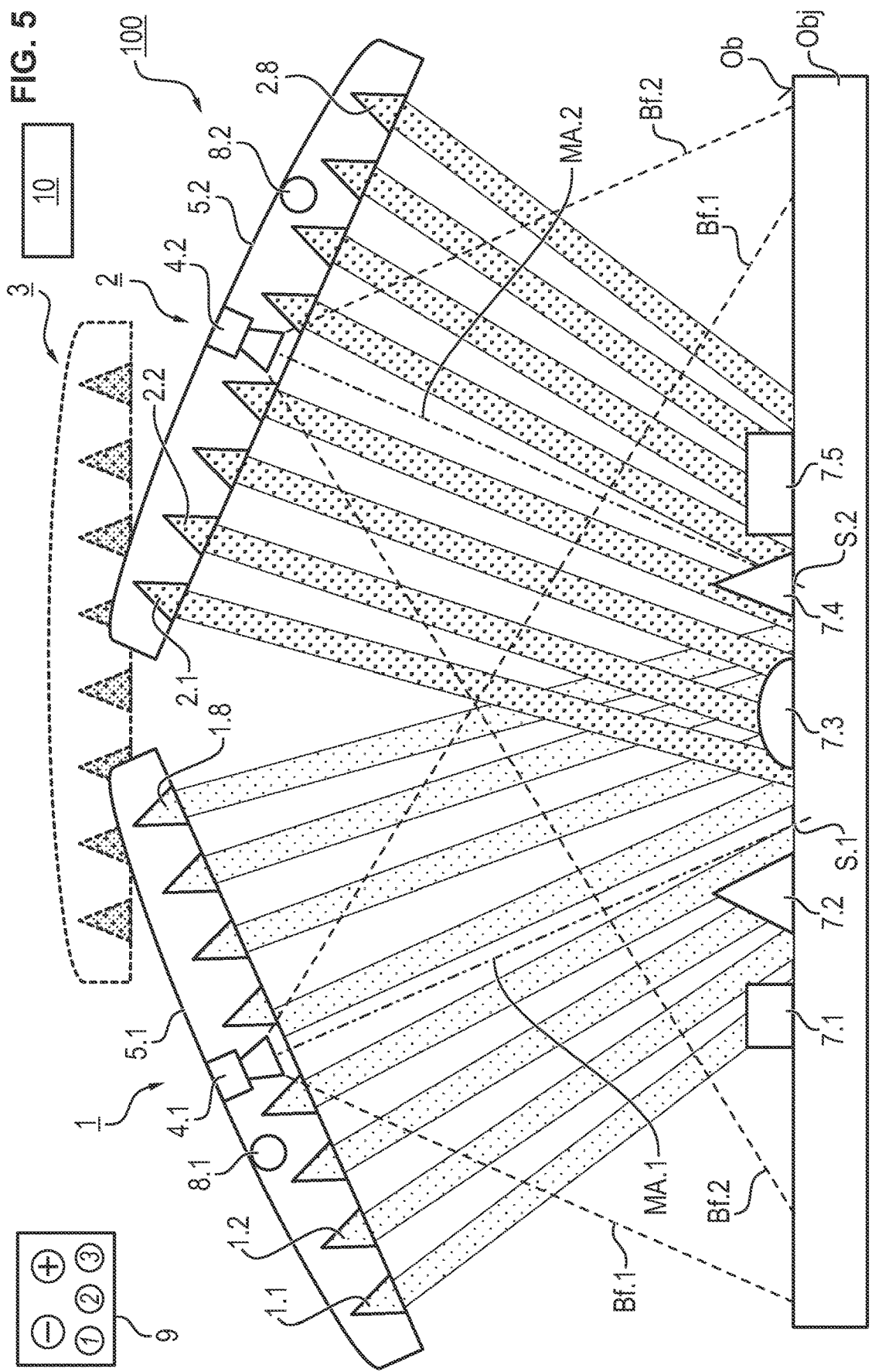
FIG. 5 is a schematic cross-sectional view of an illumination device with two cameras and three illumination units illuminating an uneven surface.

The illumination device 100 of the embodiment comprises three illumination units 1, 2, 3, which illuminate the operating table Obj vertically or obliquely from above and from up to three different directions. FIG. 1 and FIG. 5 schematically show two different embodiments of the illumination device 100. Unless expressly stated otherwise, the following description refers to both embodiments.

Preferably, the illumination units 1, 2, 3 are movably attached to a ceiling and can be moved independently of each other. The respective position and orientation of each illumination unit 1, 2, 3 in space can be changed, preferably independently of the position and orientation of the or each other illumination unit. In one embodiment, the joints of each illumination unit 1, 2, 3 are configured such that the illumination unit 1, 2, 3 does not change its position and orientation relative to the illuminated surface Ob on its own, but only after user intervention. In another embodiment, each illumination unit 1, 2, 3 can be locked and unlocked in a desired position and orientation.

The illumination units 1, 2, 3 each have a center optical axis. In the embodiment example, the optical center axis of the illumination unit 1 is equal to the geometric center axis MA.1, and the optical center axis of the illumination unit 2 is equal to the geometric center axis MA.2. In the embodiment example, the first illumination unit 1 is rotationally symmetrical to a center axis MA.1, and the second illumination unit 2 is rotationally symmetrical to a center axis MA.2. The third illumination unit 3 is only schematically shown in broken line. Of course, other configurations are also possible, in particular a different number of illumination units. The illumination units 1, 2, 3 are not necessarily rotationally symmetrical. In the orientation shown in FIG. 1 and FIG. 5 the two illumination units 1 and 2 are shown, the two geometric center axes MA.1 and MA.2 enclose an angle between them which is preferably between 25° and 70°. The two center axes MA.1 and MA.2 are oblique on the illuminated surface Ob and lie in the drawing planes of FIG. 1 and FIG. 5 and FIG. 6. MA.1 and MA.2. In the situation shown, the central axis MA.3 of the illumination unit 3 is perpendicular to the illuminated surface Ob.

Along the optical center axis MA.1, MA.2 the illuminance and the irradiance of an illumination unit 1, 2 are maximal. More precisely, in a plane perpendicular to the optical center axis MA.1, MA.2, the illuminance and irradiance assume their maximum values at the intersection of the plane with the optical center axis MA.1, MA.2. The same applies to the third illumination unit 3. The maximum illuminance and the maximum irradiance in space of the illumination unit 1, 2, 3 also lie on the optical center axis MA.1, MA.2. In FIG. 1 and FIG. 5 the intersections S.1 and S.2 of the two optical center axes MA.1 and MA.2 with the illuminated surface Ob are plotted.

Figure 2:
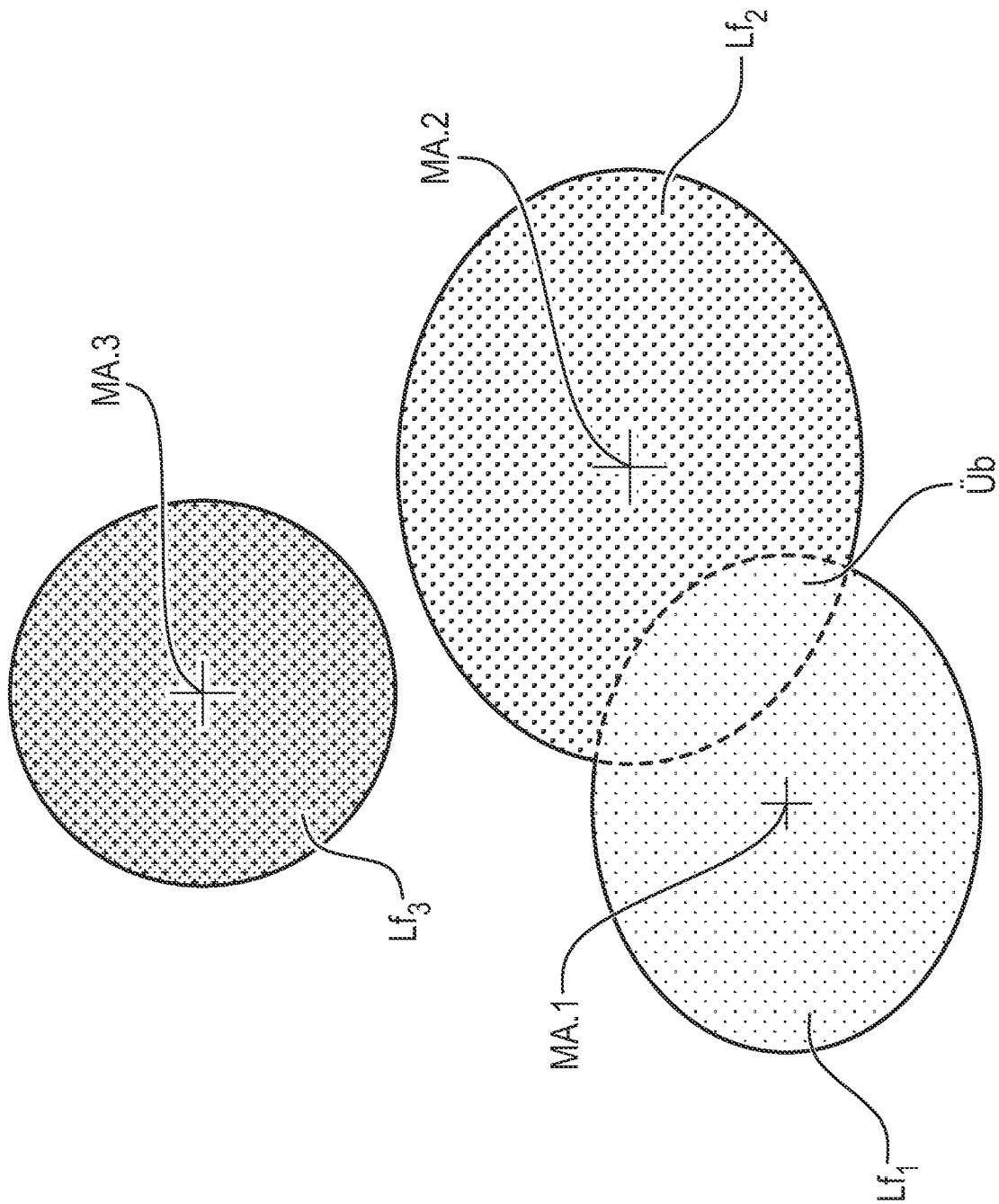
FIG. 2 is a view showing an example of three light fields produced by three illumination units of FIG. 1 where two light fields overlap.

FIG. 2 schematically illustrates the three light fields $Lf_1$, $Lf_2$, $Lf_3$, which the illumination units 1, 2, 3 generate in a possible situation on the illuminated surface Ob. The illuminated surface Ob lies in the drawing plane of FIG. 2 and the two center axes MA.1 and MA.2 are oblique on this drawing plane. Shown are the two ellipses on which the illuminance and thus the irradiance is 10% of the respective maximum illuminance and thus the irradiance on the surface Ob. Inside these ellipses, the illuminance and irradiance are greater than, outside less than, 10% of the respective maximum. The interiors of these two ellipses are dotted differently for illustration purposes. The central axis MA.3 of the third illumination unit 3 is perpendicular to the illuminated surface Ob in the situation shown, so that the area on which the irradiance is 10% of the maximum irradiance is a circle. In the situation shown, this circle does not overlap with the two ellipses of the two illumination units 1 and 2. For example, the two illumination units 1 and 2 illuminate the chest area of the patient, and the illumination unit 3 illuminates a leg. In another possible situation not shown, two light fields overlap almost concentrically.

The orientations of the three illumination units 1, 2, 3 relative to the illuminated surface Ob result in that the illuminated surface Ob and thus a patient on the operating table Obj being illuminated from three different directions. In general, the patient is therefore still illuminated even if an object, for example a part of a physician's body or an instrument, comes into the area between the illumination device 100 and the illuminated surface Ob.

The first illumination unit 1 comprises a support 5.1 and several individual light sources 1.1, 1.2, . . . , which are fixed to the support 5.1 and are preferably arranged rotationally symmetrically about the central axis MA.1, cf. FIG. 1 and FIG. 5. The second illumination unit 2 comprises a support 5.2 and several individual light sources 2.1, 2.2, . . . , which are fixed to the support 5.2 and are preferably arranged rotationally symmetrically about the central axis MA.2. FIG. 1 and FIG. 5 show schematically the light beams $Lb_{1.1}$, $Lb_{1.2}$, . . . of the light sources 1.1, 1.2, . . . as well as the light beams $Lb_{2.1}$, $Lb_{2.2}$, . . . of the light sources 2.1, 2.2, . . . For illustration purposes these light beams are dotted differently. The light sources can emit light of the same color temperature or light in at least two different color temperatures.

Each light beam $Lb_{1.1}$, $Lb_{1.2}$, . . . , $Lb_{2.1}$, $Lb_{2.2}$, . . . generates a single light field on the illuminated surface Ob. The individual light fields of the light sources of an illumination unit 1, 2, 3 are superimposed on the illuminated surface Ob to form a respective light field $Lf_1$, $Lf_2$, $Lf_3$. The individual irradiances for a point on the illuminated surface Ob therefore add up. The illumination device 100 achieves a total light field $Lf_{ges}$ on the surface Ob.

Figure 4A:
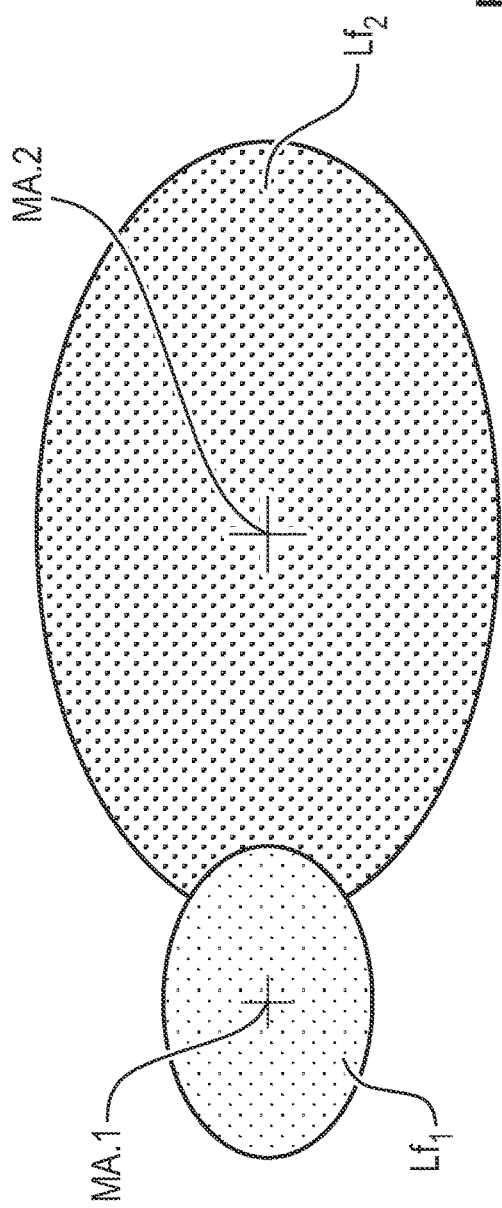
FIG. 4A and FIG. 4B are schematic views showing a second example of the light fields of two illumination units and the resulting total light field.
Figure 4B:
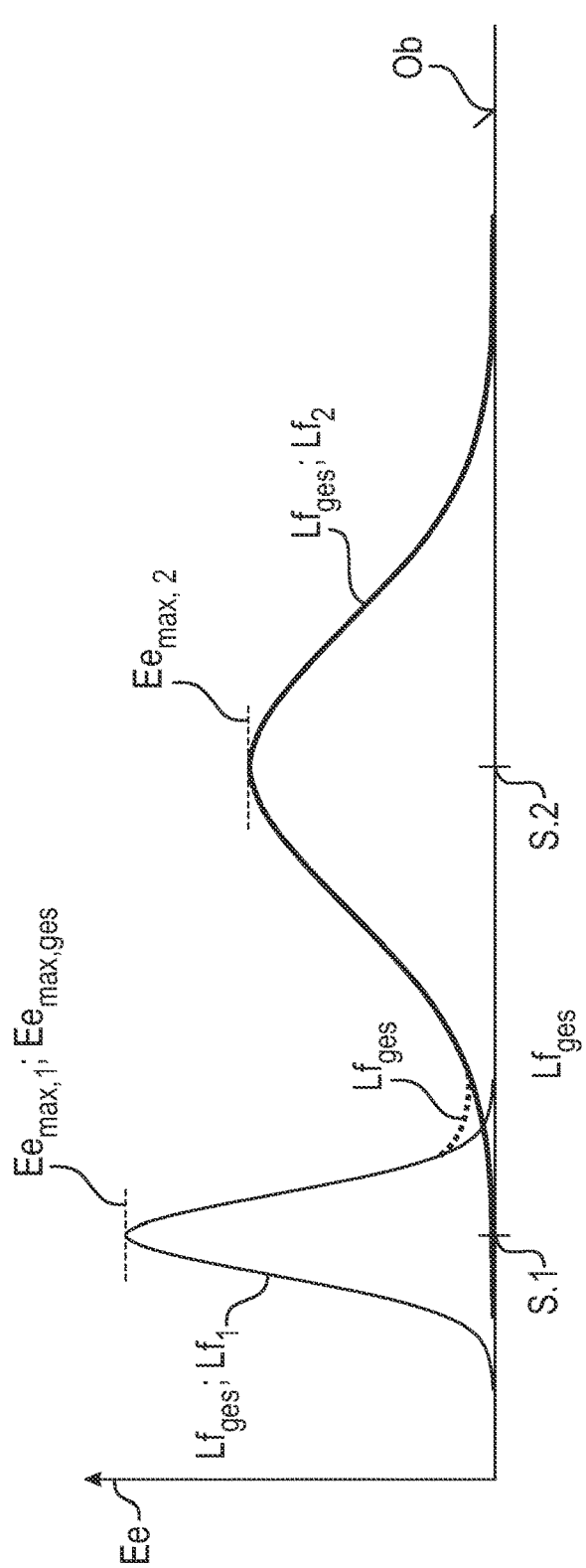

The generated total light field $Lf_{ges}$ is illustrated by two examples shown in FIG. 3 and FIG. 4. The illumination units 1 and 2 are switched on, and the illumination unit 3 is switched off. The illuminated surface Ob is perpendicular to the drawing planes of FIG. 3A, FIG. 3B, and FIG. 4B and the optical center axis MA.1 and MA.2 lie in these drawing planes. Conversely, the illuminated surface lies in the drawing plane of FIG. 4A. In FIG. 3A the two illumination units 1 and 2 as well as the two center axes MA.1 and MA.2 are shown schematically at the top. In FIG. 3B and FIG. 4B the respective irradiance Ee on the surface Ob is plotted on the y-axis. Shown is a section through the two light fields $Lf_1$ and $Lf_2$ of the two illumination units 1 and 2 as well as a section through the total light field $Lf_{ges}$. For simplicity, the two light fields $Lf_1$ and $Lf_2$ are shown to be rotationally symmetrical to the respective center axis MA.1 and MA.2, and the influence of the oblique center axis MA.1, MA.2 is neglected. In FIG. 4 another example is shown, where the two light fields $Lf_1$ and $Lf_2$ overlap only slightly.

The illumination device 100 further comprises an operating unit (adjustment unit) 9, shown only schematically, and a signal-processing control unit 10, also shown only schematically. The operating unit 9 is capable of receiving a user specification (user input/setting) and forwarding it to the control unit 10. The control unit 10 thereby captures (acquires/detects) this user specification. Preferably, a user can use the operating unit 9 to specify setting values for different parameters of an illumination unit 1, 2, 3 or the entire illumination device 100.

In particular, a user can specify a desired maximum illuminance in space for each illumination unit 1, 2, 3 respectively, for example on a stepless or graduated scale from 0 to 10, where the value 10 corresponds to the maximum achievable illuminance in space. The value 5 results in the actual maximum achievable illuminance in space being equal to half of the maximum achievable illuminance. Or the user specifies that the value should be increased or decreased. As an example, a minus key and a plus key are shown. Furthermore, the user can enter a default for each illumination unit 1, 2, 3 respectively, which specifies a desired light field diameter $d_x$ and optionally also a mean light spectrum of the illumination unit 1, 2, 3. The desired light field diameter $d_x$ refers to a reference distance of, for example, 1 m. In one embodiment, the user can also specify whether or not this illumination unit 1, 2, 3 should be included in an automatically executed limitation of the total irradiance. Furthermore, the user can select or deselect an illumination unit 1, 2, 3 by means of the operating unit 9, which is described further below.

The user may further specify the following parameters for the illumination device 100:
 an upper threshold on the maximum total irradiance that the illumination device 100 achieves on the illuminated surface Ob, and
 whether the irradiance-limiting mode should be activated or deactivated.
The meanings are explained below.

The control unit 10 captures (acquires) the specifications from the user and controls the light sources of the illumination unit 1, 2, 3 according to the specifications. For example, the control unit 10 sets the strength of the current flowing through a light source 1.1, 1.2, ..., 2.1, 2.2, ... or the electrical voltage applied to the light source 1.1, 1.2, ..., 2.1, 2.2, ... to a respective corresponding value. Preferably, the light sources 1.1, 1.2, ..., 2.1, 2.2, ... are operated in pulsed mode, the pulse frequency being high enough for an observer to perceive a constant illumination.

By modulating the pulse width, the control unit 10 is also able to change the illumination intensity of a light source 1.1, 1.2, ..., 2.1, 2.2, .... In pulse width modulation, the control unit changes the ratio between the duration of a pulse in which power is supplied to the light source and the duration of a period between two successive pulses. In one embodiment, the control unit 10 is capable of changing the respective illuminance of one light source independently of the illuminances of the other light sources.

In the embodiment example, the control unit 10 has read access to a table that can be evaluated by a computer, in which a maximum achievable illuminance of the illumination unit 1, 2, 3 in space resulting from the specification is stored in each case for several possible default values that the user can specify. For example, it is stored that the preset value 10 on a scale of 1 to 10 results in a desired maximum illuminance of 160 kLux in space, which is equal to the maximum achievable illuminance, and the preset value 5 results in half of the maximum achievable illuminance, i.e. 80 kLux. This table is established and stored during a previous calibration of the illumination unit 1, 2, 3. The table is preferably valid for each similar illumination unit 1, 2, 3 and is stored in a data memory of the illumination unit 1, 2, 3. If the illumination device 100 comprises differently configured illumination units 1, 2, 3, preferably also different tables are stored. Preferably, the table for an illumination unit 1, 2, 3 further stores which setting values for the light sources of the illumination unit 1, 2, 3 lead to the desired maximum illuminance in space. The tables are set up and stored in advance. The control unit 10 has read access to these tables.

For each illumination unit 1, 2, 3, the control unit 10 "knows" and uses the respective value for each of the parameters mentioned below, which value does not depend on the position and orientation of the illumination unit 1, 2, 3 relative to the surface Ob:
the maximum achieved illuminance and/or irradiance in space,
the functional dependence of the maximum illuminance and/or irradiance on the surface Ob on the distance along the optical center axis,
optionally the light spectrum,
the light field diameter $d_x$ at a reference distance and whether the illumination unit 1, 2, 3 should be included in a limitation of the total irradiance or not.

The maximum irradiance achieved in space of the illumination unit 1, 2, 3 is denoted by $Ee_{max,1,sp}$, $Ee_{max,2,sp}$, $Ee_{max,3,sp}$.

In one embodiment, a user specifies a respective setting value for the maximum irradiance achieved $Ee_{max,1,sp}$, $Ee_{max,2,sp}$, $Ee_{max,3,sp}$ in space of each illumination unit 1, 2, 3. The control unit 10 is able to control each illumination unit 1, 2, 3 according to this setting value. For example, the setting value 10 results in the maximum achievable illuminance in space, and the setting value 5 results in half. In one embodiment, a proportionality factor between the maximum irradiance and the maximum illuminance is stored, for example 4 W/m^2 kLux. The setting value 10 then leads, for example, to a maximum irradiance of 640 W/m^2. In a further embodiment, a table is stored which provides the respective resulting proportionality factor between the maximum irradiance and the maximum illuminance in space for several possible light spectra of an illumination unit 1, 2, 3. For each illumination unit 1, 2, 3, the control unit 10 derives the maximum irradiance achieved or also the maximum irradiance to be expected in space of the illumination unit 1, 2, 3 from the respective setting value, the maximum achievable illuminance in space and the proportionality factor.

In the following, the term "maximum total irradiance" $Ee_{max,ges}$ is used as an abbreviation for the effected (caused) or predicted maximum irradiance of the illumination device 100 on the illuminated surface Ob.

In an implementation, the control unit 10 automatically determines the maximum total irradiance $Ee_{max,ges}$ that the illumination device 100 achieves on the illuminated surface Ob. More specifically, it determines an estimated value $Ee_{max,ges,est}$ for the maximum irradiance $Ee_{max,ges}$. It is possible that the control unit 10 performs this determination with a constant sampling frequency. In a preferred implementation, the control unit 10 determines the maximum total irradiance $Ee_{max,ges}$ again whenever an irradiance-relevant event has been detected. An irradiance-relevant event changes the maximum total irradiance $Ee_{max,ges}$ or is at least capable of changing it. Examples of an irradiance-relevant event are:
The distance between an illumination unit 1, 2, 3 and the surface was changed, in particular reduced.
A user has touched a support of an illumination unit 1, 2, 3: this touch is usually performed with the objective of changing the position and/or orientation of this illumination unit 1, 2, 3 relative to the surface.

Preferably, the illumination device 100 comprises sensors capable of detecting an irradiance-relevant event. A signal from such a sensor is transmitted to the control unit 10. In another application, the control unit 10 automatically predicts what maximum total irradiance $Ee_{max,ges}$ of the illumination device 100 is expected to occur in response to a user specification—more specifically, will occur or would occur if the user specification is or would be implemented unchanged.

In order to determine at least approximately the maximum total irradiance $Ee_{max,ges}$ that the illumination device 100 actually achieves on the illuminated surface Ob, the control unit 10 in the embodiment example uses the current actuations of the illumination units 1, 2, 3 as well as further sensor values. In order to at least approximately predict what maximum total irradiance $Ee_{max,ges}$ the illumination device 100 would achieve if a user specification were implemented unchanged, the control unit 10 uses this user specification and otherwise the actual controls of the illumination units 1, 2, 3. Thus, for example, if the user specifies that the maximum irradiance $Ee_{max,1,sp}$ in the space of the illumination unit 1 should be increased to the maximum value, the control unit 10 uses this maximum value for the maximum irradiance $Ee_{max,1,sp}$, on the other hand, the actual current light field diameter and the actual current correlated color temperature of the illumination unit 1, as well as the respective currently achieved maximum irradiance, maximum light field diameter and correlated color temperature of the other two illumination units 2 and 3, for the prediction. Note: also a user specification, by which the light field diameter or the correlated color temperature of an illumination unit 1, 2, 3 is to be changed, can result in the maximum total irradiance $Ee_{max,ges}$ being increased.

A maximum allowable upper threshold for the maximum total irradiance $Ee_{max,ges}$ is stored in a data memory of the illumination device 100. This maximum allowable upper threshold is, for example, 700 W/m^2 or 1000 W/m^2. These values are derived from the above standard for a single medical illumination unit. Note: The above standard specifies an upper threshold for a single illumination unit but does not specify an upper threshold for an illumination device with multiple illumination units.

A user can specify a lower value for this upper threshold, but not a larger value. The upper threshold used, i.e., the factory or user-specified upper threshold, is designated $Ee_{max,req}$. The control unit 10 compares the determined or predicted maximum total irradiance $Ee_{max,ges}$ to the upper threshold $Ee_{max,req}$.

In one possible implementation, the illumination device 100 is always operated in an irradiance-limiting mode. The control unit 10 automatically ensures that the actual maximum total irradiance $Ee_{max,ges}$ achieved is always less than or equal to the upper threshold $Ee_{max,req}$. Thus, if a user specification would cause the upper threshold $Ee_{max,req}$ to be exceeded, the control unit 10 causes the upper threshold $Ee_{max,req}$ not to be exceeded despite the user specification. This is explained below using the example that the user specification specifies the following: the maximum irradiance $Ee_{max,1,sp}$ in space of the illumination unit 1 is to be increased, for example to the maximum value. If this user specification would be executed and all other settings of the illumination units 1, 2, 3 would remain unchanged, the upper threshold $Ee_{max,req}$ would be exceeded in this example. In one implementation, in response to this prediction, the control unit 10 does not increase the maximum irradiance $Ee_{max,1,sp}$ of the illumination unit 1 as much as desired by the user, in extreme cases not at all. In another, preferred form of implementation, the control unit 1 does increase the maximum irradiance $Ee_{max,1,sp}$ in space of the illumination unit 1 as specified by the user's specification, but decreases the maximum irradiance $Ee_{max,2,sp}$, $Ee_{max,3,sp}$ of another illumination unit 2 or 3, thereby ensuring that the upper threshold $Ee_{max,req}$ is not exceeded.

In another possible implementation, this irradiance-limiting mode is optionally activated or deactivated, for example by the user with the aid of the operating unit 9 or also automatically by the control unit 10. When the irradiance-limiting mode is deactivated, the control unit 10 does not prevent the maximum total irradiance $Ee_{max,ges}$ from exceeding the upper threshold $Ee_{max,req}$. Preferably, the control unit 10 generates an alarm when the predicted or determined maximum total irradiance $Ee_{max,ges}$ is above the upper threshold $Ee_{max,req}$. This alarm is output in a form that can be perceived by a human.

It has already been mentioned that a user can select at least one illumination unit 1, 2, 3 of the illumination device 100. Schematically shown in FIG. 1 and FIG. 5 three buttons labeled 1, 2, 3 are shown on the operating unit 9. The control unit 10 does not consider the or each selected illumination unit 1, 2, 3 in determining or predicting the maximum total irradiance $Ee_{max,ges}$ of the illumination device 100. Alternatively, the control unit 10 considers only the or each selected illumination unit 1, 2, 3.

An implementation is explained by way of example for the case where the user has selected illumination unit 3. Illumination units 1 and 2 are directed at the patient's chest or face, for example, and the light fields $Lf_1$ and $Lf_2$ overlap there. The illumination unit 3 illuminates a leg of the patient, and the light field $Lf_3$ of the illumination unit 3 does not overlap with the light fields $Lf_1$ and $Lf_2$. In this implementation, the maximum irradiance produced by illumination units 1 and 2 together on the patient's chest and face, respectively, should be less than or equal to the upper threshold $Ee_{max,req}$. The illumination unit 3 does not illuminate the chest or face, but a less sensitive area of the patient, and is not included in the limitation of the maximum total irradiance.

In the embodiments described below, all three illumination units 1, 2, 3 are included in the prediction or determination of the total irradiance, i.e., the user has not selected or deselected any illumination unit.

The maximum total irradiance $Ee_{max,ges}$ depends in particular on the following parameters:
 the respective maximum illuminance achieved by the illumination units 1, 2, 3 on the surface Ob, and
 how the light fields $Lf_1$, $Lf_2$, $Lf_3$, which the illumination units 1, 2, 3 achieve on the surface Ob, are positioned relative to each other.

The maximum irradiance achieved on the surface Ob is denoted by $Ee_{max,1}$, $Ee_{max,2}$, $Ee_{max,3}$ and is less than or equal to the maximum irradiance achieved in the space of the illumination unit 1, 2, 3. In the embodiment example, the assumption is used that the maximum irradiance $Ee_{max,1}$, $Ee_{max,2}$, $Ee_{max,3}$ occurs on the respective optical center axis MA.1, MA.2, MA.3.

FIG. 2, FIG. 3 and FIG. 4 show several examples of how the two light fields $Lf_1$, $Lf_2$ of the two illumination units 1, 2 are positioned relative to each other. The respective maximum irradiance $Ee_{max,1}$ and $Ee_{max,2}$, the resulting total light field $Lf_{ges}$ and the maximum total irradiance $Ee_{max,ges}$, i.e. the maximum irradiance of this total light field $Lf_{ges}$ on the illuminated surface Ob, are shown.

The control unit 10 determines an estimated value for the currently achieved or expected maximum total irradiance $Ee_{max,ges}$. This estimated value is designated $Ee_{max,ges,est}$. To determine the estimated value, the control unit 10 uses the respective value of at least one, optionally each parameter described above, which does not depend on the positions and orientations of the illumination units 1, 2, 3 relative to the illuminated surface Ob, in particular configuration-related and therefore predetermined parameters as well as actuations of the illumination units 1, 2, 3. The control unit 10 compares this estimated value $Ee_{max,ges,est}$ with the upper threshold $Ee_{max,req}$.

In various embodiments of the invention, the control unit 10 further determines the respective value of none, one or more of the following parameters that depend on the current positions and orientations of the illumination units 1, 2, 3 relative to the illuminated surface Ob, and uses the or at least one, preferably each, determined parameter value to determine the estimated value $Ee_{max,ges,est}$:
 the respective distance between each illumination device 1, 2, 3 and the surface Ob, measured along the respective optical center axis MA.1, MA.2, MA.3,
 the respective distance between two intersections of two optical center axes MA.x, MA.y (y #x) with the surface Ob,
 the respective light field diameter $d_x$, which each illumination unit 1, 2, 3 achieves on the illuminated surface Ob,
 another characteristic of the respective light field $Lf_1$, $Lf_2$, $Lf_3$ of each illumination unit 1, 2, 3,
 whether at least two light fields on the illuminated surface overlap or not, and
 the angle between the optical center axis of the illumination unit 1, 2, 3 and the plane in which the surface Ob extends.

In the following, an embodiment is first described in which the control unit 10 does not determine and use a value for any of the above parameters that depend on position and/or orientation. Instead, two simplifying assumptions are made. Due to these two simplifying assumptions, the determined estimated value $Ee_{max,ges,est}$ is always greater than or equal to the actual maximum total irradiance $Ee_{max,ges}$, but not less. "So one is on the safe side."

One simplification is that the respective maximum illuminance and thus irradiance in space of each illumination unit 1, 2, 3 occurs on the illuminated surface Ob. According to the other simplification, all optical center axes MA.1, MA.2, MA.3 intersect the surface Ob in the same point. A consequence: the three generated light fields $Lf_1$, $Lf_2$, $Lf_3$ are positioned concentrically to each other. On a flat surface Ob, the three generated light fields $Lf_1$, $Lf_2$, $Lf_3$ are concentric ellipses, especially circles.

In particular, these two simplifications eliminate the need to measure or otherwise determine the distances between an illumination unit 1, 2, 3 and the surface Ob and relative positioning of the light fields $Lf_1$, $Lf_2$, $Lf_3$ with respect to each other, and result in the control unit 10 determining the estimated value $Ee_{max,ges,est}$ as the sum of the maximum irradiances in space, i.e.

$$Ee_{max,ges,est} = Ee_{max,1,sp} + Ee_{max,2,sp} + Ee_{max,3,sp}. \quad (1)$$

The configurations according to FIG. 3 and FIG. 4 are two examples of the fact that the assumption described above can lead to the control unit 10 setting an illuminance and thus irradiance for at least one illumination unit 1, 2, 3 that is too low, i.e. that the illuminance of an illumination unit 1, 2, 3 and the resulting maximum total irradiance $Ee_{max,ges}$ are smaller than the upper threshold $Ee_{max,req}$. It is therefore possible that the illuminance/irradiance of at least one illumination unit 1, 2, 3 is smaller than desired by the user. Several embodiments are described below, in which the need to make the simplifications just described is avoided.

In one embodiment, a user additionally specifies which illumination units 1, 2, 3 generate or possibly generate overlapping light fields. The simplification just described is preferably used for those illumination units that generate light fields that overlap according to the specification. The maximum irradiance generated by these illumination units with overlapping light fields is generated according to the simplifications just described. As maximum total irradiance $Ee_{max,ges,est}$ this maximum irradiance in space or the maximum irradiance of another illumination unit in space is used, whichever is greater.

An example applies to the situation shown in FIG. 2 and FIG. 3. According to this example, the light fields $Lf_1$, $Lf_2$ of the two illumination units 1 and 2 overlap, and the light field $Lf_3$ of the illumination unit 3 does not overlap. Then the estimated value for the maximum total irradiance $Ee_{max,ges,est}$ is determined or predicted as follows:

$$Ee_{max,ges,est} = \max[Ee_{max,1,sp} + Ee_{max,2,sp}, Ee_{max,3,sp}]. \quad (2)$$

Even with this estimated value, "one is still on the safe side".

The embodiment described below eliminates the need for a user to specify which light fields overlap or can overlap. This preferred embodiment is described below. Also in this embodiment described below, the assumption just described can be used, for example, the maximum total irradiance $Ee_{max,ges,est}$ can be determined or predicted according to formula (2).

A first camera 4.1 is attached to the support 5.1, cf. FIG. 1 and FIG. 5. That area of the illuminated surface Ob which is illuminated by at least one illumination unit 1, 2 lies in the field of view Bf.1 of the first camera 4.1. In the embodiment according to FIG. 5 a second camera 4.2 is additionally attached to the support 5.2. The illuminated area is also in the field of view Bf.2 of the second camera 4.2. It is also possible that a camera is attached to a separate support.

The first camera 4.1 and the optional second camera 4.2 each generate an image of the illuminated surface Ob. This image looks, for example, similar to that shown in FIG. 2, and FIG. 4.

The images of a camera 4.1 or also of both cameras 4.1 and 4.2 show the light fields $Lf_1$, $Lf_2$, $Lf_3$. However, from an image of a camera 4.1, 4.2 it is not yet clear which light field comes from which illumination unit.

The control unit 10 is able to determine from the images of the camera 4.1 and optionally of the two cameras 4.1 and 4.2 as well as from the signals of these three sensors which light field originates from which illumination unit. Preferably, the control unit 10 also uses the respective light field diameter $d_x$, which is set at the illumination unit 1, 2, 3.

In the following, a first implementation is described how the control unit 10 permanently or at least periodically detects which light field $Lf_1$, $Lf_2$, $Lf_3$ originates from which illumination unit 1, 2, 3. During a measurement period in which this detection is carried out, the three illumination units 1, 2, 3—more generally: those illumination units that are currently in use—are operated in pulsed mode, as follows:

In a first alternative of the first implementation, only exactly one illumination unit 1, 2, 3 is switched on at any time, and all other illumination units are switched off. During the time period, each illumination unit 1, 2, 3 is switched on at least once as the only one, preferably several times.

In a second alternative, exactly one illumination unit 1, 2, 3 is switched off at any time, and all other illumination units are switched on. During the time period, each illumination unit 1, 2, 3 is switched off at least once as the only one, preferably several times. The second implementation leads in many cases to a higher irradiance than the first implementation.

Preferably, the measurement period is short enough that the respective position and orientation of each illumination unit relative to the surface is not significantly changed during the measurement period. Preferably, the pulse frequency for both alternatives is so high that an observer perceives the three illumination units 1, 2, 3 as permanently switched on and illuminated, i.e. does not perceive any flickering.

The first camera 4.1 and, in one embodiment, the optional second camera 4.2 each capture a sequence of images. The following boundary condition is observed: at least one image of the sequence shows only the first light field $Lf_1$, at least one image only the second light field $Lf_2$, at least one image only the third light field $Lf_3$. The control unit 10 evaluates these images, the control unit 10 preferably superimposing the images computationally. The control unit 10 derives information of at least one of the following by the evaluation:

the respective light field diameter $d_x$ actually achieved on the surface Ob of each illumination unit 1, 2, 3—this may deviate from the light field diameter $d_x$ at the reference distance, whether and, if so, to what extent the light fields $Lf_1$, $Lf_2$, $Lf_3$ overlap, the distances of the points of maximum illuminance and/or center points of the light fields $Lf_1$, $Lf_2$, $Lf_3$ on the surface Ob from each other, how the respective areas of maximum irradiance of the illumination units 1, 2, 3 are positioned relative to each other on the surface Ob.

In order to determine which light field $Lf_1$, $Lf_2$, $Lf_3$ originates from which illumination unit 1, 2, 3, the control unit 10 determines, in the first alternative, which light field is shown in an image when the illumination unit x (x=1,2,3) is switched on and each other illumination unit y (y #x) is switched off. Accordingly, in the second alternative, the control unit 10 determines which light field is not shown. By image processing, the control unit 10 determines which illumination units 1, 2, 3 generate light fields that currently overlap.

In a second implementation, at least one, preferably each illumination unit 1, 2, 3 comprises a respective sensor that indicates the current position and orientation of the illumination unit 1, 2, 3 in space. The control unit 10 uses signals from these sensors to decide which light field originates from which illumination unit 1, 2, 3.

The two implementations can be combined with each other. The first implementation with the two alternatives has the advantage that no sensor is needed to measure the position or orientation of an illumination unit 1, 2, 3 in space.

In the just described embodiments, the respective maximum irradiance $Ee_{max,1,sp}$, $Ee_{max,2,sp}$, $Ee_{max,3,sp}$ of an illumination unit 1, 2, 3 in space is used as the maximum irradiance $Ee_{max,1}$, $Ee_{max,2}$, $Ee_{max,3}$ of this illumination unit 1, 2, 3 on the surface Ob. This embodiment sometimes leads to a maximum total irradiance $Ee_{max,ges}$ that is significantly lower than the upper threshold $Ee_{max,req}$. Therefore, the respective distance $dist_1$, $dist_2$, $dist_3$ between an illumination unit 1, 2, 3 and the illuminated surface Ob is preferably measured and used.

In a preferred embodiment, it is justified to assume that the maximum irradiance $Ee_{max,1}$, $Ee_{max,2}$, $Ee_{max,3}$, which an illumination unit 1, 2, 3 achieves on the illuminated surface Ob, occurs at the respective point of intersection between the optical center axis MA.1, MA.2, MA.3 of this illumination unit 1, 2, 3 and the surface Ob, irrespective of which angle occurs between this optical center axis MA.1, MA.2, MA.3 and the operating table Obj and thus the surface Ob. In the examples shown in FIG. 2 to FIG. 4 this is the case: the maximum irradiance $Ee_{max,1}$, $Ee_{max,2}$ occurs at the intersection point S.1 or 5.2. The assumption is especially justified if $2*d_{50} > d_{10}$ applies.

Under this assumption, it is sufficient to measure the distance $dist_1$, $dist_2$ along the optical center axis between the illumination unit 1, 2, 3 and the illuminated surface Ob. The control unit 10 has read access to a respective computer evaluable table for each illumination unit 1, 2, 3. In this table, a respective proportionality factor between the maximum irradiance $Ee_{max,1,sp}$, $Ee_{max,2,sp}$, $Ee_{max,3,sp}$ in space and the maximum irradiance Ee max,1, $Ee_{max,2}$, $Ee_{max,3}$ on the surface Ob is stored for different distances. Preferably, this proportionality factor applies to each illumination unit 1, 2, 3. Of course, it is possible that a proportionality factor is stored for each illumination unit 1, 2, 3 and for different distances.

In one embodiment, the control unit 10 determines and uses the respective distance $dist_1$, $dist_2$, $dist_3$ between an illumination unit 1, 2, 3, but uses the simplifying assumption that the light fields $Lf_1$, $Lf_2$, $Lf_3$ are arranged concentrically to each other. The control unit 10 determines the respective maximum irradiance on the surface Ob and derives the estimated value $Ee_{max,ges,est}$ for the maximum total irradiance $Ee_{max,ges}$, for example, according to the following calculation rule:

$$Ee_{max,ges,est} = Ee_{max,1} + Ee_{max,2} + Ee_{max,3}. \quad (3)$$

The following calculation rule is also possible if it is specified or determined that the light field $Lf_3$ of the illumination unit 3 does not overlap with the other two light fields $Lf_1$, $Lf_2$:

$$Ee_{max,ges,est} = \max[Ee_{max,1} + Ee_{max,2}, Ee_{max,3}]. \quad (4)$$

It is possible that an object enters the area between an illumination unit 1, 2, 3 and the illuminated surface Ob, for example an instrument or a body part of a treating physician. If the optical center axis MA.1, MA.2, MA.3 then passes through this object, the control unit 10 automatically detects this event. This is because the distance measured along the center axis MA.1, MA.2, MA.3 decreases abruptly. The control unit 10 preferably uses as distance between the illumination unit 1, 2, 3 and the surface Ob the value that has been measured before this abrupt reduction.

Various embodiments are described below for measuring the distance along the optical center axis MA.1, MA.2, MA.3.

In one embodiment, at least one distance sensor is attached to each of at least one support 5.1, 5.2, 5.3. This distance sensor measures the distance between itself and the reflecting illuminated surface Ob. In the example of FIG. 1 such a distance sensor 6.2 is shown, which is attached to the support 5.2 of the second illumination unit 2 and measures the distance $dist_2$ between itself and the illuminated surface Ob along the center axis MA.2. Preferably, at least one distance sensor is attached to each support 5.1, 5.2, 5.3. It is possible that a lateral distance occurs between the distance sensor and the center axis MA.1, MA.2, MA.3. This distance as well as an angle between the center axis MA.1, MA.2, MA.3 and the axis in which the distance sensor measures the distance are known from the configuration of the illumination unit 1, 2, 3. Preferably, the control unit 10 is able to correct a measurement result of the distance sensor by means of the distance and the angle in order to determine the distance along the center axis.

In one implementation, the first camera 4.1 and/or the optional second camera 4.2 each have an autofocus function such that the camera 4.1, 4.2 focus on the illuminated surface Ob. In one implementation, the control unit 10 uses the setting of this autofocus to determine the respective distance. It is possible for the control unit 10 to receive a plurality of measurements of distance from a plurality of sensors, respectively, and aggregate these measurements into a distance.

As already explained, the control unit 10 detects the respective light field diameter $d_x$, for example $d_{10}$, of each illumination unit 1, 2, 3. This light field diameter $d_x$ is related to a predefined reference distance of, for example, 1 m. Preferably, the control unit 10 "knows" the respective imaging scale of the or each camera 4.1, 4.2 used. The light field diameter $d_x$ and the imaging scale determine how large the image of the light field $Lf_1$, $Lf_2$, $Lf_3$ of an illumination unit 1, 2, 3 is when the plane of the light field $Lf_1$, $Lf_2$, $Lf_3$ is perpendicular to the optical center axis MA.1, MA.2, MA.3 and is at reference distance from the illumination unit 1, 2, 3. In one embodiment, the control unit 10 derives an estimate of the distance $dist_1$, $dist_2$, $dist_3$ between the illumination unit 1, 2, 3 and the surface Ob measured along the center axis MA.1, MA.2, MA.3 from this quantity and the actual quantity in an image of the camera 4.1, 4.2. It is also possible that the control unit 10 measures how large an image of a light field is in the image of a camera 4.1, 4.2. From the size of the image and the light field diameter $d_x$ at the reference distance, the control unit 10 derives the sought distance between the camera 4.1, 4.2 and thus the illumination unit 1, 2 on the one hand and the light field $Lf_1, Lf_2, Lf_3$ and thus the illuminated surface Ob on the other hand. Optionally, the control unit 10 uses the imaging scale of the camera 4.1, 4.2, which can be changed in an implementation of the camera 4.1, 4.2.

It is possible that at least one illumination unit 1, 2, 3 comprises its own camera and/or other own distance sensor and at least one other illumination unit neither its own camera nor other own distance sensor. In some cases, the respective distance can nevertheless be measured at least approximately. In the following these implementations are exemplarily described for the illumination units shown in FIG. 1 in which only the second illumination unit 2 has a distance sensor 6.2 and therefore only the distance $dist_2$ between the second illumination unit 2 and the illuminated surface Ob can be measured directly.

In the situation shown in FIG. 1, the control unit 10 in one implementation uses images of the camera 4.1 with the field of view Bf.1 to determine the respective size and position of each light field $Lf_1, Lf_2, Lf_3$ on the illuminated surface Ob. The control unit 10 also "knows" the respective geometry and the respective light field diameter $d_x$ of each illumination unit 1, 2, 3. Furthermore, the control unit 10 "knows" the diameter of that circular area which the light sources 1.1, 1.2, . . . , 2.1, 2.2, . . . occupy on the support 5.1, 5.2, 5.3 as a whole, i.e. the diameter of the respectively generated light beam on the support 5.1, 5.2, 5.3. The control unit 10 determines for each illumination unit 1, 2, 3 the respective ratio between the diameter of the light field at the illumination unit 1, 2, 3 and the diameter of the light field $Lf_1, Lf_2, Lf_3$, which the illumination unit 1, 2, 3 generates on the illuminated surface Ob. From these ratios and from the measured distance $dist_2$, the control unit 10 approximately determines the remaining distances.

The following simplified assumption is also possible for an illumination unit 1, 2, 3 without a distance sensor: the actual distance $dist_1, dist_2, dist_3$ between this illumination unit 1, 2, 3 is equal to the reference distance of, for example, 1 m specified above.

As already explained, the control unit 10 uses the respective distance between an illumination unit 1, 2, 3 and the illuminated surface Ob to determine the respective maximum irradiance $Ee_{max,1}, Ee_{max,2}, Ee_{max,3}$ of this illumination unit 1, 2, 3 on the surface Ob. This distance is measured, for example, along the center axis MA.1, MA.2, MA.3.

In one embodiment, the simplifying assumption is used that the maximum illuminance $Ee_{max,1}, Ee_{max,2}, Ee_{max,3}$ generated by an illumination unit 1, 2, 3 on the surface Ob occurs at the intersection S.1, S.2, S.3 between the optical center axis MA.1, MA.2, MA.3 of this illumination unit 1, 2, 3 and the illuminated surface Ob, independent of the angle between the center axis MA.1, MA.2, MA.3 and the surface Ob. The following embodiment avoids the need to presuppose this simplifying assumption and takes into account the possibility that the center axis MA.1, MA.2, MA.3 is not perpendicular but oblique to this plane and that, therefore, the maximum irradiance also occurs for a bell-shaped light field $Lf_1, Lf_2, Lf_3$ outside the intersection of the center axis with the plane. It can be assumed that the illuminated surface Ob extends in a plane.

Further above, an embodiment was described in which one sensor each measures the current orientation of the illumination unit 1, 2, 3 in space. In one embodiment, the control unit 10 derives the angle between the center axis MA.1, MA.2, MA.3 and the surface Ob from a signal from this sensor. An alternative embodiment eliminates the need to provide such a sensor. This alternative embodiment is described below with reference to FIG. 5 and FIG. 6.

In this embodiment, at least one camera 4.1 is configured as a so-called 3D camera, preferably both cameras 4.1, 4.2. The camera 4.1, 4.2 has a field of view Bf.1 or Bf.2 and provides for each pixel not only a brightness value as a gray scale or color value, but additionally for each pixel or at least for a sufficiently large number of pixels the distance between the pixel and the illuminated surface Ob, measured in the direction of the optical center axis MA.1, MA.2 of the camera 4.1, 4.2. In the example shown, this optical center axis coincides with the center axis MA.1, MA.2 of the illumination unit 1, 2.

Figure 6:
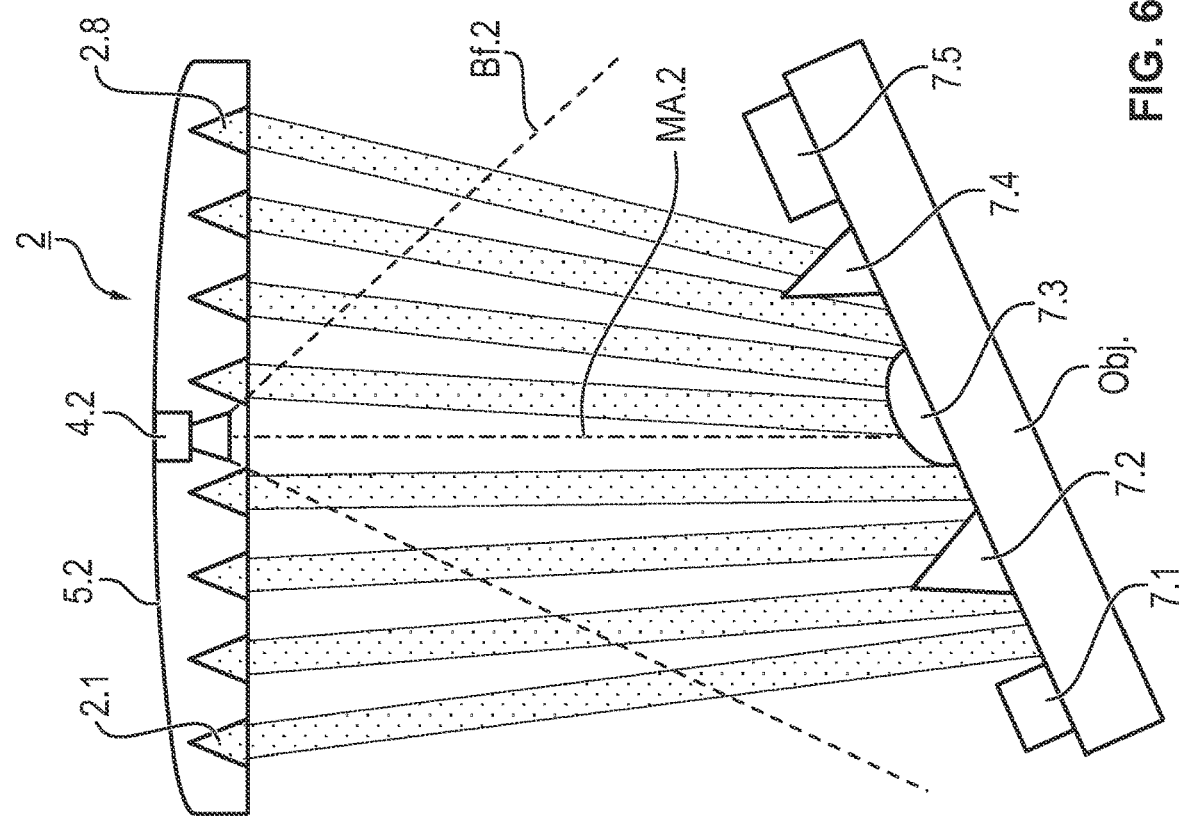
FIG. 6 is a schematic cross-sectional view of an illumination device with the second illumination unit of FIG. 5 with a camera, the second illumination unit illuminating the uneven surface.

As a rule, the illuminated surface Ob does not have a flat contour. Examples are shown in FIG. 5 and FIG. 6 of five elevations 7.1, . . . , 7.5. The camera 4.1, 4.2 scans the illuminated surface Ob without contact and thereby obtains a topographic profile of the surface Ob in the viewing direction MA.1, MA.2. Such a camera has become known as a "time-of-flight sensor". Such a process is described, for example, in DE 10 2013 012 231 A1 and DE 10 2012 014 716 A1, which are discussed above. Other embodiments for a sensor that generates a topographic profile are also possible, for example a suitable laser scanner, radar scanner or lidar scanner. It is also possible that a sensor generating a topographic profile is spatially separated from the camera 4.1, 4.2.

Figure 7A:
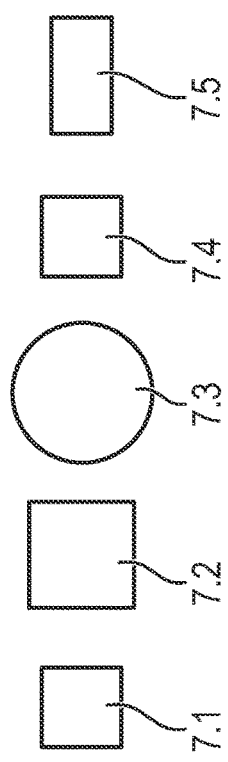
FIG. 7A is a view showing a topographic profile generated by a camera of the arrangement of FIG. 5 with the optical axis of the camera perpendicular to the illuminated surface.
Figure 7B:
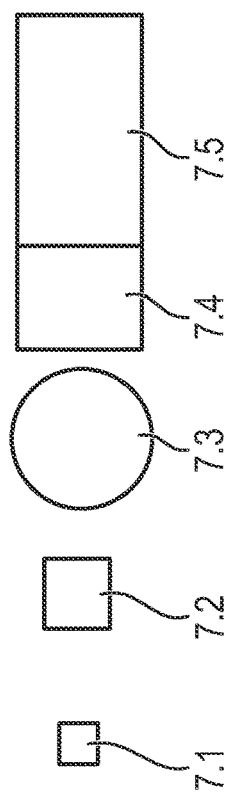
FIG. 7B is a view showing a topographic profile generated by a camera of the arrangement of FIG. 5 with the optical axis of the camera at one angle to the illuminated surface.
Figure 7C:
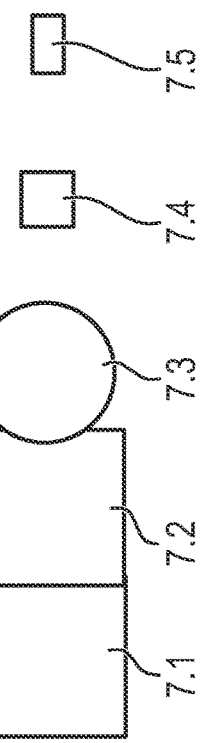
FIG. 7C is a view showing topographic profile generated by a camera of the arrangement of FIG. 5 with the optical axis of the camera at another angle to the illuminated surface.

FIG. 5 illustrates how the two 3D cameras 4.1 and 4.2 each generate a topographic profile of the illuminated surface Ob with these five elevations 7.1, . . . , 7.5 from two different viewing directions. FIG. 6 shows how the second illumination unit 2 is positioned relative to the illuminated surface Ob. FIG. 7A shows the five elevations 7.1, . . . , 7.5 in a topographic profile when the optical axis of the camera is perpendicular to the illuminated surface Ob, which is not the case for the two cameras 4.1 and 4.2. FIG. 7B shows the five elevations 7.1, . . . , 7.5 in a topographic profile of the camera 4.2 on the support 5.2 of the second illumination unit 2. FIG. 7C shows the five elevations 7.1, . . . , 7.5 in a topographic profile of the camera 4.1. As is known, the closer an elevation 7.1, . . . , 7.5 is to the respective camera 4.1, 4.2, the larger it is displayed.

The topographic profiles from the two cameras 4.1 and 4.2 show the same illuminated surface Ob from two different viewing directions. Optionally, there is also a topographic profile from a 3D camera (not shown) whose optical axis is perpendicular to the illuminated surface Ob.

The control unit 10 "knows" the position of the 3D camera 4.1, 4.2 relative to the optical center axis MA.1, MA.2. From this information, the control unit 10 automatically derives the position of the center axis MA.1, MA.2 relative to the respective topographic profile provided by the camera 4.1, 4.2. By evaluating the topographic profile and the position of the center axis MA.1, MA.2, the control unit 10 derives the distance between the illumination unit 1, 2 and the illuminated surface Ob, measured along the center axis MA.1, MA.2. By a computational comparison between these topographic profiles, the control unit 10 determines the distance between the two intersection points S.1 and S.2 of the two center axes MA.1, MA.2 with the illuminated surface Ob. From this and from the respective light field diameter $d_x$ of the illumination units 1, 2 at the reference distance, the control unit 10 derives how much the two light fields $Lf_1$ and $Lf_2$ overlap, cf. FIG. 2 to FIG. 4.

In one embodiment, the control unit 10 further determines the respective angle between the center axis MA.1, MA.2 and the plane in which the illuminated surface Ob extends. For example, the control unit 10 computationally performs a coordinate transformation to bring two topographic profiles into congruence with each other. These two profiles show the same surface Ob. From the comparison, for example from the coordinate transformation, the control unit 10 derives the angle between the two optical center axes MA.1, MA.2 of the illumination units 1, 2.

The or at least one topographic profile measured by a 3D camera 4.1, 4.2 changes abruptly when another object enters the field of view Bf.L1, Bf.2 of a camera 4.1, 4.2. The control unit 10 automatically detects this event. To detect this event, the control unit 10 preferably uses the current topographic profile with the topographic profile that was last measured before the detection of this event. Often, this topographic profile of the illuminated surface Ob does not change as long as the object is in the field of view Bf.1, Bf.2 and no other object comes into the field of view Bf.1, Bf.2. Preferably, the detection of the event that another object has entered the field of view Bf.1, Bf.2 does not trigger the step of changing a maximum irradiance.

As already explained, when operating in limitation mode, the control unit 10 automatically ensures that the determined maximum total irradiance $Ee_{max,ges}$ is less than or equal to the specified threshold $Ee_{max,req}$. As already explained, in the embodiment example the user or also a higher-level control unit (not shown) specifies a preset value for each illumination unit 1, 2, 3 respectively. From this preset value, the control unit 10 derives a maximum irradiance $Ee_{max,1,sp}$, $Ee_{max,2,sp}$ to be achieved in space of this illumination unit 1, 2, 3. The control unit 10 derives from the maximum irradiance $Ee_{max,1,sp}$, $Ee_{max,2,sp}$ in space of an illumination unit 1, 2, 3 the maximum irradiance $Ee_{max,1}$, $Ee_{max,2}$ of this illumination unit 1, 2, 3 on the surface Ob and determines which maximum total irradiance $Ee_{max,ges}$ the illumination device 100 would achieve on the illuminated surface Ob as a consequence of this preset value.

If the determined estimate $Ee_{max,ges,est}$ for the expected maximum irradiance $Ee_{max,ges}$ is above the specified upper threshold $Ee_{max,req}$, the control unit 10 automatically reduces the illuminance and thus the irradiance of at least one illumination unit 1, 2, 3, in such a way that after the reduction the specified upper threshold $Ee_{max,req}$ is maintained. In one implementation, the control unit 10 reduces the maximum illuminances to be achieved of all illumination units 1, 2, 3 by the same factor, for example by the factor $Ee_{max,ges,est}/Ee_{max,req}$. If the illuminances resulting from the preset values or the illuminances resulting from the automatic reduction result in the upper threshold $Ee_{max,req}$ being observed, the control unit 10 controls the light sources of the illumination units 1, 2, 3 in such a way that the controlled illumination units 1, 2, 3 achieve the desired maximum illuminances.

It is possible that a user increases a default value for an illumination unit x (x=1,2,3, . . . ) while the illumination device 100 is being operated. The control unit 10 automatically checks whether even the enlarged default value would still result in a maximum total irradiance $Ee_{max,ges}$ that is less than or equal to the specified upper threshold $Ee_{max,req}$. If the increased default value for the illumination unit x results in an estimated maximum irradiance $Ee_{max,ges,est}$ above the specified threshold $Ee_{max,req}$, in one embodiment, the control unit 10 automatically reduces the irradiance of another illumination unit y (y x). This embodiment results in the illumination intensity of the illumination unit x actually being increased as desired by the user, and thus, for example, a certain area of the patient is more strongly illuminated. In particular, it is made possible to illuminate the patient from a different direction than before. At the same time, this configuration ensures that the upper threshold $Ee_{max,req}$ is still maintained.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1 | First illumination unit, comprises the support 5.1, the light sources 1.1, 1.2, . . . and the camera 4.1, generates the light field $Lf_1$ |
| 1.1, 1.2, . . . | Light sources of the first illumination unit 1, attached to the support 5.1 |
| 2 | Second illumination unit, comprises the support 5.2, the light sources 2.1, 2.2, . . . and the distance sensor 6.2 or the camera 4.2, generates the light field $Lf_2$ |
| 2.1, 2.2, . . . | Light sources of the second illumination unit 2, attached to the support 5.2 |
| 3 | Third illumination unit, generates the light field $Lf_3$ |
| 4.1 | First camera, attached to the support 5.1 of the first illumination unit 1, has the field of view Bf.1 |
| 4.2 | Second camera, attached to the support 5.2 of the second illumination unit 2, has the field of view Bf.2 |
| 5.1 | Support of the first illumination unit 1, carries the light sources 1.1, 1.2, . . . |
| 5.2 | Support of the second illumination unit 2, carries the light sources 2.1, 2.2, . . . |
| 6.2 | Distance sensor of the second illumination unit 2, attached to the support 5.2 |
| 7.1, . . . , 7.5 | Increases in the illuminated surface Ob |
| 8.1, 8.2 | Touch sensor on the support 5.1, 5.2 |
| 9 | Operating unit |
| 10 | Signal processing control unit, receives signals from the cameras 4.1, 4.2 and the distance sensor 6.2, determines the maximum irradiance of the illumination device 100 and controls the light sources 1.1, 1.2, . . . , 2.1, 2.2, . . . |
| 100 | Illumination device, comprises the two illumination units 1 and 2 and optionally the third illumination unit 3 |
| Bf.1 | Camera field of view 4.1 |
| Bf.2 | Camera field of view 4.2 |
| $dist_1$ | Distance between the first illumination unit 1 and the illuminated surface Ob, is measured by the camera 4.1 |
| $dist_2$ | Distance between the second illumination unit 2 and the illuminated surface Ob, is measured by the distance sensor 6.2 or by the camera 4.2 |
| Ee | Maximum irradiance ("irradiance") |
| $Ee_{max,1}$ | Maximum irradiance of the illumination unit 1 on the surface Ob |
| $Ee_{max,1,sp}$ | Maximum irradiance in space of the illumination unit 1 |
| $Ee_{max,2}$ | Maximum irradiance of the illumination unit 2 on the surface Ob |
| $Ee_{max,2,sp}$ | Maximum irradiance in space of the illumination unit 2 |
| $Ee_{max,ges}$ | Maximum total irradiance of the illumination device 100 on the surface Ob, results from a superposition of the light fields $Lf_1$, $Lf_2$, $Lf_3$ of the three illumination units 1, 2, 3 on the surface Ob |
| $Ee_{max, ges, est}$ | Estimated value for the maximum total irradiance $Ee_{max,ges}$ |
| $Ee_{max,req}$ | Specified upper threshold for the maximum total irradiance $Ee_{max, ges}$ |
| $Lb_{1.1}$, $Lb_{1.2}$, . . . | Light beam emitted by the light source 1.1, 1.2, . . . |
| $Lb_{2.1}$, $Lb_{2.2}$, . . . | Light beam emitted by the light source 2.1, 2.2, . . . |
| $Lf_1$ | Elliptical light field generated by the first illumination unit 1 on the surface Ob |
| $Lf_{1.1}$, $Lf_{1.2}$, . . . | Light field generated by the light source 1.1, 1.2, . . . on the surface Ob |
| $Lf_2$ | Elliptical light field generated by the second illumination unit 2 on the surface Ob |

-continued

| | |
|---|---|
| Lf$_{2.1}$, Lf$_{2.2}$, ... | Light field generated by the light source 1.1, 1.2, ... on the surface Ob |
| Lf$_3$ | Circular light field generated by the third illumination unit 3 on the surface Ob |
| MA.1 | Optical center axis and geometrical symmetry axis of the first illumination unit 1 |
| MA.2 | Optical center axis and geometrical symmetry axis of the second illumination unit 2 |
| Ob | Surface of object (operating table) Obj facing illumination device 100 and therefore illuminated |
| Obj | Illuminated object (operating table), the illuminated surface has Ob |
| S.1 | Intersection of the center axis MA.1 with the illuminated surface Ob |
| S.2 | Intersection of the center axis MA.2 with the illuminated surface Ob |
| Üb | Overlapping area on the illuminated surface Ob between the two light fields Lf$_1$ and Lf$_2$ |

What is claimed is:

1. An illumination device for illuminating a surface of an object, the illumination device comprising:
   a plurality of illumination units, each of the plurality of illumination units being configured to illuminate the surface with a respective maximum irradiance, wherein the illumination device is configured to illuminate the surface with a maximum total irradiance that depends on the respective maximum irradiance of each of the plurality of illumination units;
   a signal processing control unit that is configured to control each of the plurality of illumination units independently from each other so as to change the respective maximum irradiance of the illumination unit,
   wherein the illumination device is configured to capture a user specification for the maximum total irradiance of the illumination device or for the maximum irradiance of one or more of the plurality of illumination units,
   wherein the control unit is further configured, in response to capturing the user specification and prior to implementing the user specification, to at least approximately predict the maximum total irradiance that the illumination device will achieve on the surface with the illumination device operated according to the user specification, to compare the predicted maximum total irradiance with a specified upper threshold for the maximum irradiance on the surface, and if the at least approximately predicted maximum total irradiance is greater than the upper threshold, to control at least one of the plurality of illumination units, depending on the captured user specification, such that after the control the actually achieved maximum total irradiance of the illumination device on the surface is less than or equal to the upper threshold.

2. An illumination device according to claim 1, wherein:
   each of the plurality of illumination units is configured to generate a respective light field on the surface; and
   the control unit is configured:
   to determine for each of the plurality of illumination units a respective maximum actually achieved irradiance which the illumination unit actually generates on the surface;
   to determine positions relative to each other of the generated light fields on the illuminated surface; and
   to predict the maximum total irradiance of the illumination device based on: the captured user specification; each determined maximum actually achieved irradiance; and the determined relative positions of the generated light fields.

3. An illumination device according to claim 2, further comprising an image acquisition system comprising a camera, wherein:
   the control unit is configured to control the plurality of illumination units during a measurement period such that;
   in a first alternative, during the measurement period exactly one illumination unit of the plurality of illumination units is switched on and the other illumination units of the plurality of illumination units are switched off; and
   in a second alternative, during the measurement period exactly one illumination unit of the plurality of illumination units is switched off and the other illumination units of the plurality of illumination units are switched on;
   the image acquisition system is configured to generate a sequence of images of the illuminated surface such that the respective light field of every one of the plurality of illumination units lies in a field of view of the image acquisition system;
   the sequence of images comprises, for each illumination unit respectively, at least one image of the surface generated while the respective illumination unit is switched on in the first alternative and switched off in the second alternative; and
   the control unit is configured to evaluate the sequence of images and to determine which light field originates from which illumination unit of the plurality of illumination units and to determine the relative positions of the light fields based on the determined light field origination.

4. An illumination device according to claim 1, wherein:
   each of the illumination units comprises a support with a plurality of individual light sources that provide the irradiance of the respective illumination unit;
   the illumination device is configured to capture a user specification for the maximum irradiance of a first illumination unit of the plurality of illumination units;
   the control unit is configured to control the first illumination unit such that, in response to the control, the first illumination unit achieves a maximum irradiance on the surface in accordance with the user specification; and
   the control unit is further configured to predict the maximum total irradiance of the illumination device with the user specification for the maximum irradiance of the first illumination unit implemented, and if the predicted maximum total irradiance of the illumination device is greater than the upper threshold, to control at least one other illumination unit of the plurality of illumination units such that the controlled other illumination unit achieves a lower maximum irradiance on the surface than before the control and as a result, the maximum total irradiance of the illumination device actually achieved is less than or equal to the upper threshold.

5. An illumination device according to claim 1, wherein:
   the control unit is configured to determine an illumination unit subset;
   the illumination unit subset comprises at least one illumination unit of the plurality of illumination units;
   at least one further illumination unit of the plurality of illumination units does not belong to the illumination unit subset; and
   the control unit is further configured to determine the respective maximum irradiance of each illumination unit of the illumination unit subset and to predict the maximum total irradiance of the illumination device based on the determined respective maximum irradiance of each illumination unit of the illumination unit subset.

6. An illumination device according to claim 5, wherein:
the illumination device is configured to capture a user specification that specifies the illumination unit subset or specifies every further illumination unit that does not belong to the illumination unit subset; and
the control unit is configured to determine the illumination unit subset using the captured user specification.

7. An illumination device according to claim 5, wherein:
each of the plurality of illumination units is configured to generate a respective light field on the surface; and
the control unit is configured to determine positions relative to each other of the generated light fields on the illuminated surface and to determine the illumination unit subset such that the light fields of the illumination units of the illumination unit subset overlap and the respective light field of every further illumination unit that does not belong to the illumination unit subset does not overlap with a light field of an illumination unit of the illumination unit subset.

8. An illumination device according to claim 1, wherein:
the control unit is configured to detect an irradiance-changing event that causes or at least is suitable of causing the maximum total irradiance to change;
the control unit is further configured to, in response to the detection of the irradiance-changing event, determine an actual maximum total irradiance which the illumination device actually achieves on the surface; and if the determined actually achieved total irradiance is greater than the upper threshold, to control at least one illumination unit such that after the control the maximum total irradiance of the illumination device on the surface is less than or equal to the upper threshold.

9. An illumination device according to claim 8, wherein:
at least one illumination unit of the plurality of illumination units is connected to a distance sensor such that a position and an orientation of the distance sensor relative to the illumination unit of the plurality of illumination units is fixed;
the distance sensor is configured to contactlessly measure an indicator of the distance between the connected illumination unit and the illuminated surface; and
the control unit is configured to detect the irradiance-changing event if a change in the measured distance is detected.

10. An illumination device according to claim 8, further comprising a touch sensor that is configured to detect a touch to the illumination unit, wherein the control unit is configured to detect the irradiance-changing event if the touch to the illumination unit is detected.

11. An illumination device according to claim 1, wherein:
the illumination device is configured such that an irradiance-limiting mode can be activated and deactivated;
the control unit is configured to predict the maximum total irradiance of the illumination device when the irradiance-limiting mode is activated, and if the predicted maximum total irradiance of the illumination device is greater than the upper threshold, to cause the control of at least one illumination unit to cause the maximum total irradiance actually achieved on the surface to be less than or equal to the upper threshold, and to allow the upper threshold to be exceeded when the irradiance-limiting mode is deactivated.

12. An illumination process for illuminating a surface of an object, the process comprising the steps of:
providing an illumination device comprising a plurality of illumination units for illuminating the surface;
illuminating the surface using each illumination unit achieving a respective maximum irradiance, wherein the respective maximum irradiance of one illumination unit can be changed independently of the respective maximum irradiance of each other illumination unit, wherein the illumination device illuminates the surface with a maximum total irradiance that depends on the maximum irradiances of the plurality of illumination units;
capturing a user specification concerning the maximum total irradiance of the illumination device or the respective maximum irradiance of one or more of the plurality of illumination units;
upon capturing the user specification and prior to implementing the user specification, at least approximately predicting the maximum total irradiance that the illumination device will achieve on the surface based on operation of the illumination device according to the captured user specification;
comparing the predicted maximum total irradiance to a predetermined upper threshold for the maximum irradiance on the surface; and
if the predicted maximum total irradiance is greater than the upper threshold, controlling the illumination device, depending on the captured user specification, by controlling at least one illumination unit of the plurality of illumination units such that the controlled illumination device achieves a maximum total irradiance on the surface that is less than or equal to the upper threshold.

13. An illumination process according to claim 12, wherein:
at least once a user specification concerning the maximum irradiance of a first illumination unit of the illumination device is captured as the user specification, the step of predicting the maximum total irradiance comprises the step of predicting the maximum total irradiance to be achieved upon execution of the user specification, and
controlling at least one illumination unit comprises the steps of:
controlling a first illumination unit of the plurality of illumination units such that, in response to the control, the first illumination unit achieves a maximum irradiance on the surface in accordance with the user specification; and
if the predicted maximum total irradiance is greater than the upper threshold, controlling at least one other illumination unit of the plurality of illumination units such that the controlled other illumination unit achieves a lower maximum irradiance on the surface than before the control and as a result, the maximum total irradiance of the illumination device actually achieved is less than or equal to the upper threshold.

14. An illumination device for illuminating a surface of an object, the illumination device comprising:
a plurality of illumination units, each of the plurality of illumination units being configured to illuminate the surface with a respective maximum irradiance, wherein the illumination device is configured to illuminate the surface with a maximum total irradiance that depends on the respective maximum irradiance of each of the plurality of illumination units;
an image acquisition system comprising a camera;

a signal processing control unit that is operatively connected to the illumination units and is operatively connected to the camera and is configured to control each of the plurality of illumination units independently from each other so as to change the respective maximum irradiance of the illumination unit, wherein the illumination device is configured to capture a user specification for the maximum total irradiance of the illumination device or for the maximum irradiance of one or more of the plurality of illumination units, wherein the control unit is further configured, in response to capturing the user specification, to at least approximately predict the maximum total irradiance that the illumination device will achieve on the surface with the illumination device operated according to the user specification, to compare the predicted maximum total irradiance with a specified upper threshold for the maximum irradiance on the surface, and if the at least approximately predicted maximum total irradiance is greater than the upper threshold, to control at least one of the plurality of illumination units, depending on the captured user specification, such that after the control the actually achieved maximum total irradiance of the illumination device on the surface is less than or equal to the upper threshold, wherein each of the plurality of illumination units is configured to generate a respective light field on the surface; and wherein the control unit is configured:
to determine for each of the plurality of illumination units a respective maximum actually achieved irradiance which the illumination unit actually generates on the surface;
to determine positions relative to each other of generated light fields on the illuminated surface; and
to predict the maximum total irradiance of the illumination device based on: the captured user specification; each determined maximum actually achieved irradiance; and the determined relative positions of the generated light fields, wherein the control unit is configured to control the plurality of illumination units during a measurement period such that;

in a first alternative, during the measurement period exactly one illumination unit of the plurality of illumination units is switched on and the other illumination units of the plurality of illumination units are switched off; and in a second alternative, during the measurement period exactly one illumination unit of the plurality of illumination units is switched off and the other illumination units of the plurality of illumination units are switched on;

the image acquisition system is configured to generate a sequence of images of the illuminated surface such that the respective light field of every one of the plurality of illumination units lies in a field of view of the image acquisition system;

the sequence of images comprises, for each illumination unit respectively, at least one image of the surface generated while the respective illumination unit is switched on in the first alternative and switched off in the second alternative; and the control unit is configured to evaluate the sequence of images and to determine therefrom which light field originates from which illumination unit of the plurality of illumination units and to determine the relative positions of the light fields based on the determined light field origination.

15. An illumination device according to claim 14, wherein the control unit is configured to control the plurality of illumination units in a pulsed mode during the measurement period, with switching on and off being based on pulse width modulation.

16. An illumination device according to claim 14, wherein:
each of the illumination units comprises an independently positionable support and a plurality of individual light sources that provide the irradiance of the respective illumination unit;
the illumination device is configured to capture a user specification for the maximum irradiance of a first illumination unit of the plurality of illumination units;
the control unit is configured to control the first illumination unit such that, in response to the control, the first illumination unit achieves a maximum irradiance on the surface in accordance with the user specification; and
the control unit is further configured to predict the maximum total irradiance of the illumination device with the user specification for the maximum irradiance of the first illumination unit implemented, and if the predicted maximum total irradiance of the illumination device is greater than the upper threshold, to control at least one other illumination unit of the plurality of illumination units such that the controlled other illumination unit achieves a lower maximum irradiance on the surface than before the control and as a result, the maximum total irradiance of the illumination device actually achieved is less than or equal to the upper threshold.

17. An illumination device according to claim 14, wherein:
the control unit is configured to determine an illumination unit subset;
the illumination unit subset comprises at least one illumination unit of the plurality of illumination units;
at least one further illumination unit of the plurality of illumination units does not belong to the illumination unit subset; and
the control unit is further configured to determine the respective maximum irradiance of each illumination unit of the illumination unit subset and to predict the maximum total irradiance of the illumination device based on the determined respective maximum irradiance of each illumination unit of the illumination unit subset.

18. An illumination device according to claim 17, wherein:
the illumination device is configured to capture a user specification that specifies the illumination unit subset or specifies every further illumination unit that does not belong to the illumination unit subset; and
the control unit is configured to determine the illumination unit subset using the captured user specification.

19. An illumination device according to claim 17, wherein:
each of the plurality of illumination units is configured to generate a respective light field on the surface; and
the control unit is configured to determine positions relative to each other of the generated light fields on the illuminated surface and to determine the illumination unit subset such that the light fields of the illumination units of the illumination unit subset overlap and the respective light field of every further illumination unit that does not belong to the illumination unit subset does not overlap with a light field of an illumination unit of the illumination unit subset.

20. An illumination device according to claim 14, wherein:
- the control unit is configured to detect an irradiance-changing event that causes or at least is suitable of causing the maximum total irradiance to change;
- the control unit is further configured to, in response to the detection of the irradiance-changing event, determine an actual maximum total irradiance which the illumination device actually achieves on the surface; and if the determined actually achieved total irradiance is greater than the upper threshold, to control at least one illumination unit such that after the control the maximum total irradiance of the illumination device on the surface is less than or equal to the upper threshold.

* * * * *